(12) United States Patent
Suyama et al.

(10) Patent No.: US 8,577,649 B2
(45) Date of Patent: Nov. 5, 2013

(54) ANOMALY DETECTING APPARATUS

(71) Applicants: Akihiro Suyama, Tokyo (JP); Yuuichi Hanada, Saitama-Ken (JP)

(72) Inventors: Akihiro Suyama, Tokyo (JP); Yuuichi Hanada, Saitama-Ken (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 0 days.

(21) Appl. No.: 13/628,951

(22) Filed: Sep. 27, 2012

(65) Prior Publication Data

US 2013/0024172 A1    Jan. 24, 2013

Related U.S. Application Data

(63) Continuation of application No. PCT/JP2010/055695, filed on Mar. 30, 2010.

(51) Int. Cl.
*G06F 17/10*    (2006.01)

(52) U.S. Cl.
USPC .................................................. 703/2; 703/6

(58) Field of Classification Search
None
See application file for complete search history.

(56) References Cited

U.S. PATENT DOCUMENTS

| | | | |
|---|---|---|---|
| 6,223,544 B1 | 5/2001 | Seem | |
| 7,548,831 B2 * | 6/2009 | Suyama | 702/181 |
| 7,590,513 B2 * | 9/2009 | Jiang et al. | 703/2 |
| 2008/0288210 A1 * | 11/2008 | Imahara et al. | 702/179 |
| 2011/0276828 A1 * | 11/2011 | Tamaki et al. | 714/26 |

FOREIGN PATENT DOCUMENTS

| | | |
|---|---|---|
| JP | 3254624 B2 | 12/2002 |
| JP | 2003-131733 A | 5/2003 |
| JP | 2003-208219 A | 7/2003 |
| JP | 2008-065393 A | 3/2008 |

OTHER PUBLICATIONS

International Search Report dated Apr. 27, 2010 from PCT/JP2010/055695.

International Preliminary Report on Patentability dated Nov. 1, 2012 from corresponding International Patent Application No. PCT/JP2010/055695, 6 pages.

\* cited by examiner

*Primary Examiner* — Omar Fernandez Rivas
*Assistant Examiner* — Herng-Der Day
(74) *Attorney, Agent, or Firm* — Ohlandt, Greeley, Ruggiero & Perle, L.L.P.

(57) ABSTRACT

There is provided an apparatus, including a first storage storing first time-series data including instruction values given to first to K-th control devices and measured values from first to K-th sensors during a first period, a model optimizer, for each of combinations of two of the control devices, generating a diagnostic model instance of a predetermined target model and obtaining an optimized diagnostic model instance in which parameters of the diagnostic mode instance are identified, a second storage storing second time-series data acquired during a second period, a calculator, for each of the optimized diagnostic model instances, calculating a determination score for each of the control devices and sensors using the first and second time-series data, and a determiner determining presence or absence of an abnormality for each of the control devices and the sensors based on each determination score.

8 Claims, 29 Drawing Sheets

| 1 | X Building.1A.I.VAV.1.damper position |
|---|---|
| 2 | X Building.1A.I.VAV.2.damper position |
| 3 | X Building.1A.I.VAV.3.damper position |
| ⋮ | ⋮ |
| 11 | X Building.1A.I.VAV.1.flow rate |
| 12 | X Building.1A.I.VAV.2.flow rate |
| 13 | X Building.1A.I.VAV.3.flow rate |
| ⋮ | ⋮ |
| 133 | X Building.12C.I.VAV.1.damper position |
| 134 | X Building.12C.I.VAV.2.damper position |
| 135 | X Building.12C.I.VAV.3.damper position |
| ⋮ | ⋮ |
| 143 | X Building.12C.I.VAV.1.flow rate |
| 144 | X Building.12C.I.VAV.2.flow rate |
| 145 | X Building.12C.I.VAV.3.flow rate |
| ⋮ | ⋮ |

| Time | 1 | 2 | 3 | ... | 11 | 12 | 13 | ... | 133 | 134 | 135 | ... | 143 | 144 | 145 | ... |
|---|---|---|---|---|---|---|---|---|---|---|---|---|---|---|---|---|
| 2009/12/21 00:00 | 0 | 0 | 0 | ... | 0 | 0 | 0 | ... | 0 | 0 | 0 | ... | 0 | 0 | 0 | ... |
| 2009/12/21 00:10 | 0.2 | 0.3 | 0.2 | ... | 0.10 | 0.13 | 0.11 | ... | 0.7 | 0.7 | 0.75 | ... | 0.20 | 0.21 | 0.24 | ... |
| 2009/12/21 00:20 | 0.25 | 0.3 | 0.2 | ... | 0.12 | 0.14 | 0.11 | ... | 0.8 | 0.83 | 0.85 | ... | 0.22 | 0.24 | 0.25 | ... |
| ... | ... | ... | ... | ... | ... | ... | ... | ... | ... | ... | ... | ... | ... | ... | ... | ... |
| 2009/12/21 23:50 | 0 | 0 | 0 | ... | 0 | 0 | 0 | ... | 0 | 0 | 0 | ... | 0 | 0 | 0 | ... |

FIG. 6

F-01 : (C1 + β1(<[s1].[s2].[s3].VAV.[s4].damper position>))
*(<[s1].[s2].[s3].VAV.[s4].flow raete>/<[s1].[s2].[s3].VAV.[s5].damper position>))
−(C2 + β2(<[s1].[s2].[s3].VAV.[s5].damper position>))

F-02 : (C1 + β1(<[s1].[s2].[s3].CAV.[s4].damper position>))
*(<[s1].[s2].[s3].CAV.[s4].flow raete>/<[s1].[s2].[s3].CAV.[s5].damper position>))
−(C2 + β2(<[s1].[s2].[s3].CAV.[s5].damper position>))

F-03 : (C1 + β1(<[s1].[s2].[s3].VAV.[s4].damper position>))
*(<[s1].[s2].[s3].VAV.[s4].flow rate>/<[s1].[s2].[s3].CAV.[s5].damper position>))
−(C2 + β2(<[s1].[s2].[s3].CAV.[s5].damper position))

F-04 : (C1 + β1(<[s1].[s2].[s3].CAV.[s4].damper position>))
*(<[s1].[s2].[s3].CAV.[s4].flow rate>/<[s1].[s2].[s3].VAV.[s5].damper position>))
−(C2 + β2(<[s1].[s2].[s3].VAV.[s5].damper position>))

F-05 : (C1 + β1(<[s1].[s2].[s3].cold water valve.[s4].damper position>))
*(<[s1].[s2].[s3].cold water.[s4].flow rate>/<[s1].[s2].[s3].cold water.[s5].damper position>))
−(C2 + β2(<[s1].[s2].[s3].cold water valve.[s5].damper position>))

F-06 : (C1 + β1(<[s1].[s2].[s3].hot water valve.[s4].damper position>))
*(<[s1].[s2].[s3].hot water.[s4].flow rate>/<[s1].[s2].[s3].hot water.[s5].damper position>))
−(C2 + β2(<[s1].[s2].[s3].hot water valve.[s5].damper position>))

| Time | 1 | 2 | 3 | ... | 11 | 12 | 13 | ... | 133 | 134 | 135 | ... | 143 | 144 | 145 | ... |
|---|---|---|---|---|---|---|---|---|---|---|---|---|---|---|---|---|
| 2010/8/22 00:00 | 0 | 0 | 0 | ... | 0 | 0 | 0 | ... | 0 | 0 | 0 | ... | 0 | 0 | 0 | ... |
| 2010/8/22 00:10 | 0.2 | 0.3 | 0.2 | ... | 0.10 | 0.13 | 0.11 | ... | 0.71 | 0.71 | 0.75 | ... | 0.20 | 0.21 | 0.24 | ... |
| 2010/8/22 00:20 | 0.25 | 0.3 | 0.2 | ... | 0.12 | 0.14 | 0.11 | ... | 0.8 | 0.83 | 0.85 | ... | 0.22 | 0.24 | 0.25 | ... |
| ... | ... | ... | ... | ... | ... | ... | ... | ... | ... | ... | ... | ... | ... | ... | ... | ... |
| 2010/8/22 23:50 | 0 | 0 | 0 | ... | 0 | 0 | 0 | ... | 0 | 0 | 0 | ... | 0 | 0 | 0 | ... |

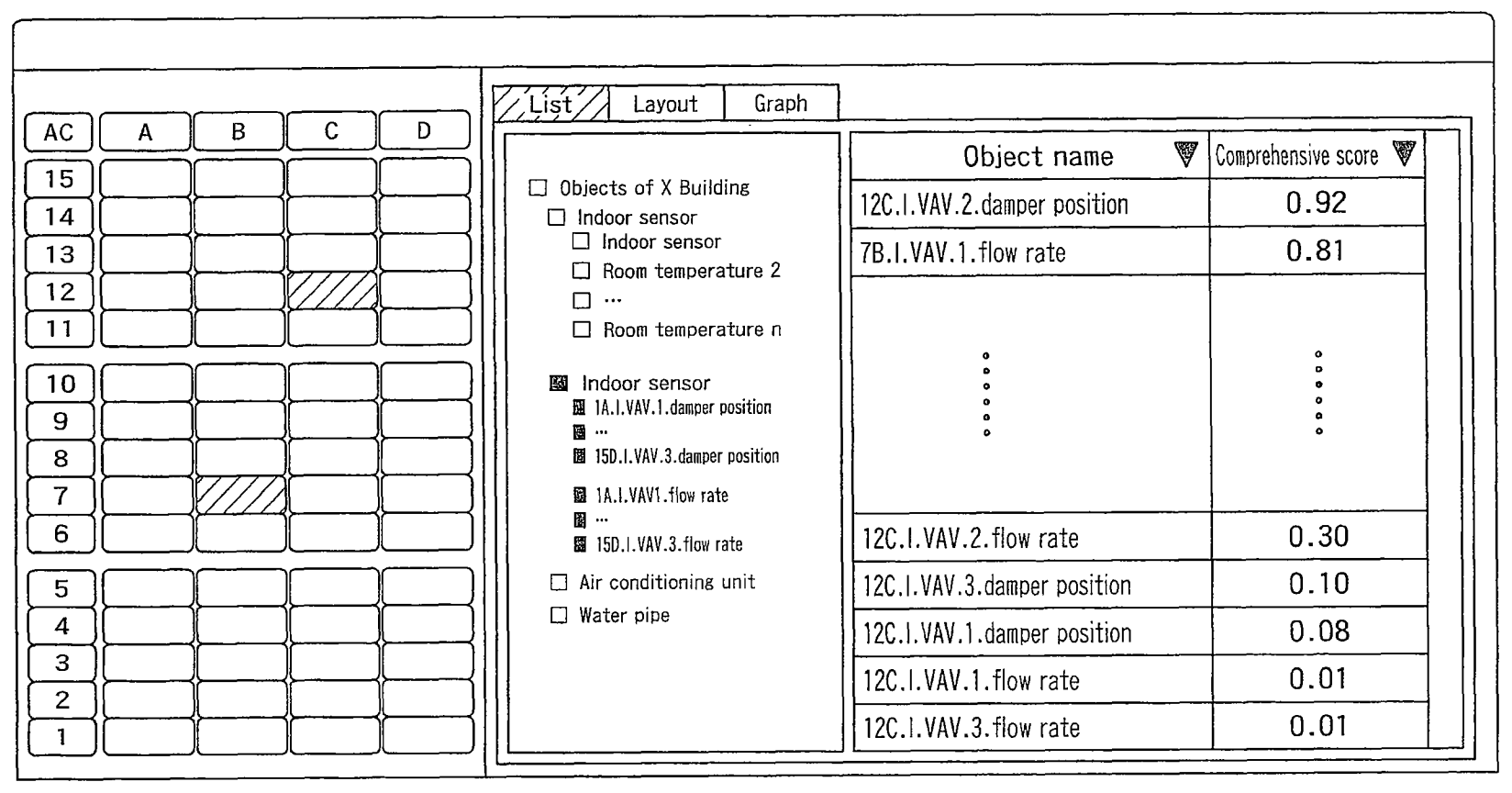

| Object name | Comprehensive score |
|---|---|
| 12C.I.VAV.2.damper position | 0.92 |
| 7B.I.VAV.1.flow rate | 0.81 |
| ...... | ...... |
| 12C.I.VAV.2.flow rate | 0.30 |
| 12C.I.VAV.3.damper position | 0.10 |
| 12C.I.VAV.1.damper position | 0.08 |
| 12C.I.VAV.1.flow rate | 0.01 |
| 12C.I.VAV.3.flow rate | 0.01 |

List / Layout / Graph

- ☐ Objects of X Building
  - ☐ Indoor sensor
    - ☐ Indoor sensor
    - ☐ Room temperature 2
    - ☐ ...
    - ☐ Room temperature n
  - ▨ Indoor sensor
    - ▨ 1A.I.VAV.1.damper position
    - ▨ 15D.I.VAV.3.damper position
    - ...
    - ▨ 1A.I.VAV1.flow rate
    - ▨ 15D.I.VAV.3.flow rate
  - ☐ Air conditioning unit
  - ☐ Water pipe

FIG. 26

ANOMALY DETECTING APPARATUS

CROSS REFERENCE TO RELATED APPLICATIONS

This application is a continuation of International Application No. PCT/JP2010/055695, filed on Mar. 30, 2010, the entire contents of which is hereby incorporated by reference.

FIELD

An embodiment relates to an anomaly detecting apparatus for detecting an abnormality in a control device.

BACKGROUND

One of methods for detecting an abnormality in a control device is model-based anomaly detection. Model-based anomaly detection refers to making a model of a process to be monitored in advance, taking a difference between data observed as an output of a process for a given input and an output predicted from the model, and outputting the degree of abnormality of a control device on the basis of a value of the difference. Model-based anomaly detection includes a model learning function of constructing an approximate model having an unknown parameter and estimating the unknown parameter from actual performance data without an abnormality.

To perform anomaly detection on a model basis, it is often necessary to define a device characteristic used in a process to be monitored, such as a Cv characteristic (flow characteristic) with respect to damper position, as a parametric function expression and construct an approximate model.

However, a device characteristic is rarely given as a mathematical expression, and the cost of providing a high-accuracy approximate model each time a new device is introduced. Additionally, each device has an individual difference and suffers from the problem of being biased and deviating from a characteristic graph.

For example, in Japanese Patent No. 3254624, a sliding characteristic as an approximate model for detecting an abnormality in stick-slip of a control valve is defined by $x''=A^* x'+B$, and the parameters "A" and "B" are estimated from actual performance data.

According to an aspect of the present invention, there is provided an anomaly detecting apparatus which allows high-accuracy detection of an abnormality in a control device having an individual difference and an unknown characteristic.

An embodiment of the present invention allows high-accuracy detection of an abnormality in a control device having an individual difference and an unknown characteristic.

BRIEF DESCRIPTION OF THE DRAWINGS

FIG. 5 is a chart showing an example of an index table;

FIG. 6 is a chart showing an example of a data table;

FIG. 7 is a view showing a plurality of examples of a target model stored in a target model storage;

FIG. 17 is a chart showing an example of time-series data stored in a time-series data storage;

FIG. 23 is a chart showing an example of correcting time-series data on the basis of accuracy information;

FIG. 26 is a view showing an example of a screen for result display;

DETAILED DESCRIPTION

Figure 1:
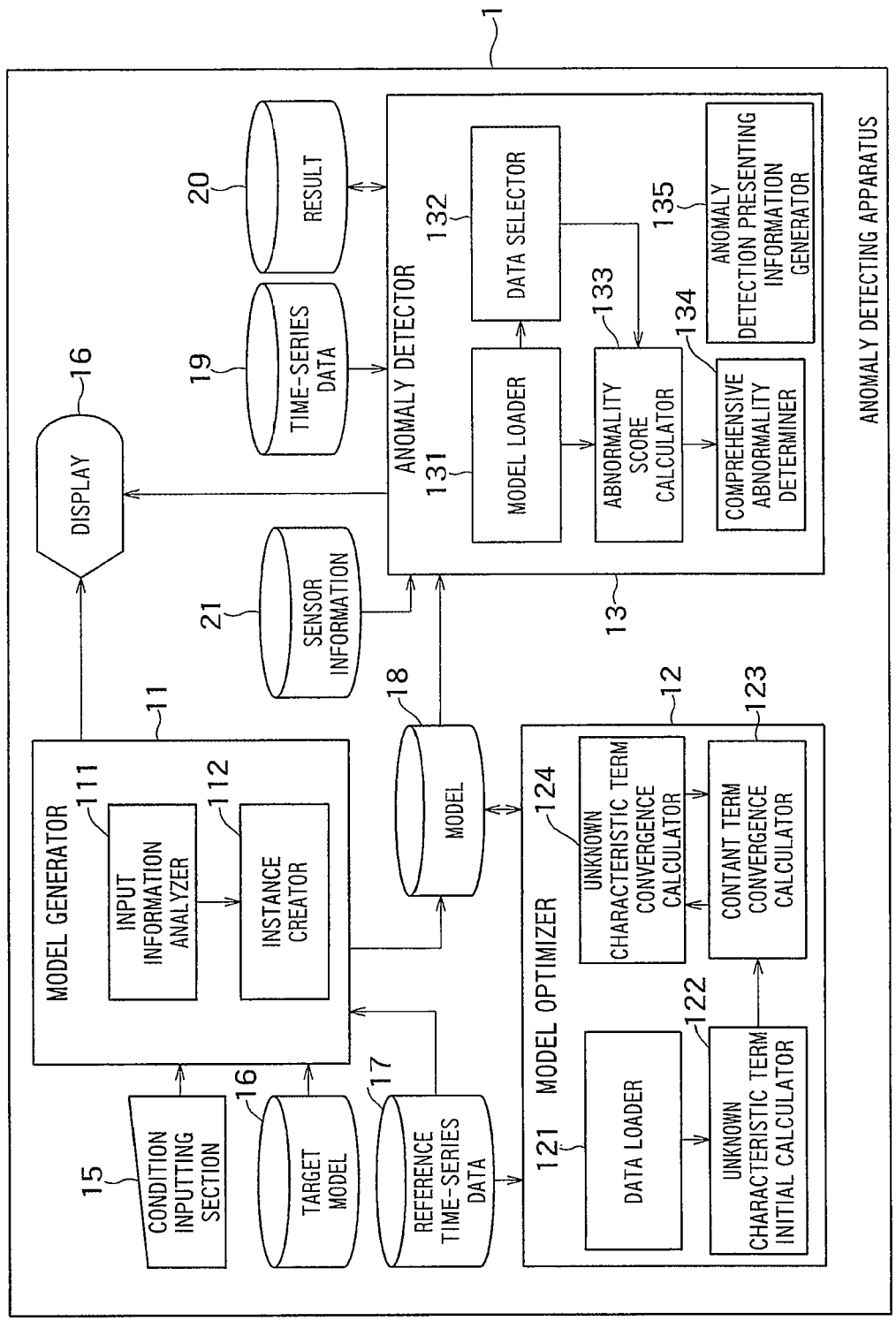
FIG. 1 is a block diagram schematically showing a configuration of an anomaly detecting apparatus as an embodiment.

According to an aspect of an embodiment, there is provided an anomaly detecting apparatus for first to K-th control devices and first to K-th sensors, the control devices being arranged at different locations on a medium path that control output of medium flowing in the medium path according to respective externally given instruction values and the sensors measuring output volumes of the medium controlled by the control devices.

The apparatus includes: a target model storage, a first storage, a model optimizer, a second storage, a third storage, a determination score calculator and a comprehensive abnormality determiner.

The target model storage stores a target model defined by $(C_i+\beta_i(X_i))\times(Q_i/Q_j)^2-(C_j+\beta_j(X_j))$, where "Xi" is a first observed variable, "$\beta_i(X_i)$" is a first unknown characteristic term that is an unknown function having input variable as "Xi," "Cr" is a first constant term, "Qi" is a second observed variable, "Xj" is a third observed variable, "$\beta_j(X_j)$" is a second unknown characteristic term that is an unknown function having input variable as "Xj," "Cj" is a second constant term, and "Qj" is a fourth observed variable.

The first storage stores first time-series data each including the instruction values given to the first to K-th control devices and measured values from the first to K-th sensors at predetermined time intervals during a first period.

The model optimizer generates, for each of combinations of two of the first to K-th control devices, a diagnostic model instance by assigning the instruction value for one of the two control devices to the "Xi" of the target model, an unknown constant corresponding to the location of the one control device to the "Ci," the measured value from the sensor corresponding to the one control device to the "Qi," the instruction value for the other control device to the "Xj," an unknown constant corresponding to the location of the other control device to the "Cj," and the measured value from the sensor corresponding to the other control device to the "Qj".

The model optimizer obtains each optimized diagnostic model instance in which the "βi(Xi)," the "Ci," the "βj(Xj)," and the "Cj" are identified using the first time-series data so as to minimize the squares of values of all of each diagnostic model instance, where the "βi(Xi)" is a function that takes values for sections partitioned in a domain of the "Xi" and the "βj(Xj)" is a function that takes values for sections partitioned in a domain of the "Xj".

The second storage stores second time-series data each including the instruction values given to the first to K-th control devices and measured values from the first to K-th sensors at predetermined time intervals during a second period different from the first period.

The third storage stores accuracy information, representing a maximum observation error of the first to K-th sensors and a maximum response error of the first to K-th control devices for the instruction values.

The determination score calculator, for each optimized diagnostic model instance, obtains first residuals being values calculated from the optimized diagnostic model instance based on each piece of the first time-series data and generates a first probability distribution which is a probability distribution of the first residuals, obtains second residuals values calculated from the optimized diagnostic model instance based on each piece of the second time-series data and generates a second probability distribution which is a probability distribution of the second residuals, changes, for each of the two control devices and two sensors based on which the optimized diagnostic model instance is generated, each corresponding value in each piece of the first time-series data according to the accuracy information, obtains third residuals being values calculated from the optimized diagnostic model instance based on each corresponding changed piece of time-series data, and generates each corresponding third probability distribution which is a probability distribution of the third residuals, and generates a first extended KL (Kulback-Leibler) divergence representing a distance between the second and first probability distributions and second extended KL divergences each representing a distance between the second probability distribution and each third probability distribution and calculates a determination score according to the ratio of the first extended KL divergence to the sum of the first extended KL divergence and each one of the second extended KL divergences, respectively.

The comprehensive abnormality determiner obtains, for each of the first to K-th control devices and the first to K-th sensors, a comprehensive score which is a minimum value of the determination scores obtained for each of the first to K-th control devices and the first to K-th sensors and, if the comprehensive score of any of the control devices and sensors is larger than a first threshold value, determines that an abnormality has occurred in the control device or the sensor.

FIG. 1 is a block diagram schematically showing a configuration of an anomaly detecting apparatus as an embodiment.

Before the apparatus in FIG. 1 is described, an example in which anomaly detection is to be performed will first be described for ease of understanding.

Figure 2:
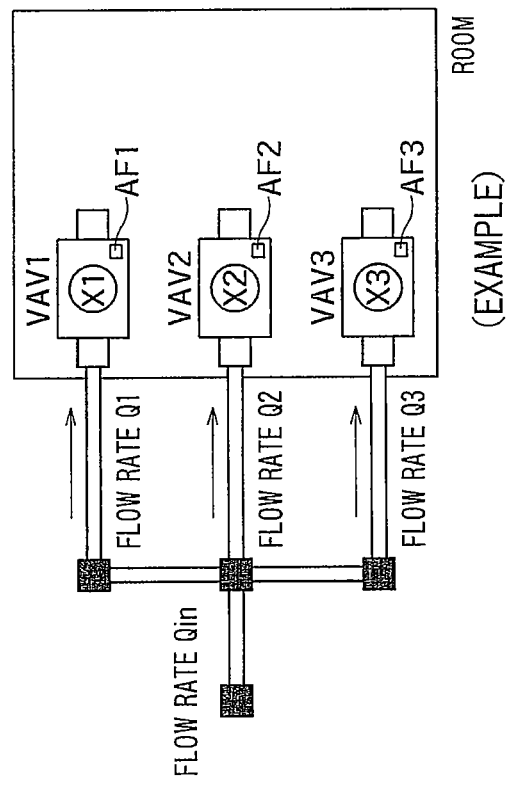
FIG. 2 is an explanatory diagram of an example for explaining the present embodiment.

FIG. 2 is an explanatory diagram of an example for explaining the present embodiment.

Assume an air conditioning system without a fan which feeds air (a medium) in a duct. One main duct exists and branches into a plurality of branch ducts (three branch ducts in this example). The main duct and branch duct correspond to an example of a medium path.

A variable air volume terminal (VAV) or a constant air volume terminal (CAV) is installed at a midpoint in each branch duct.

In this example, VAV1 to VAV3 are installed. VAV1 to VAV3 are installed at different locations. VAV1 to VAV3 include valves X1 to X3 which adjust the volume of air flowing through the respective branch ducts. VAV1 to VAV3 include actuators which adjust the position X1 to X3 according to damper position "x(k)" for a k-th (k=1, ..., n) branch duct. Each actuator adjusts the damper position and outputs air flowing into the branch duct to the outside. Damper position are generated by a controller (not shown) and are given to VAV1 to VAV3.

Flow sensors AF1 to AF3 are arranged near VAV1 to VAV3. Outlets of the branch ducts are present in one room, and the flow sensor for the k-th (k=1, ..., n) branch duct observes a flow rate measured value "Q(k)." A flow sensor observes the volume of air, output of which is controlled by a VAV (control device), (output volume).

The present apparatus sequentially stores the damper position "x(k)" and the flow rate measured value "Q(k)" for the VAV for the k-th (k=1, ..., n) branch duct in an internal storage together with an observation time and detects an actuator/sensor abnormality on the basis of stored data. That is, the present apparatus detects whether there is a large discrepancy between the VAV damper position "x(k)" and actual position (there is an position abnormality) and whether there is a large discrepancy between the flow sensor reading "Q(k)" and an actual flow rate (there is an abnormality in the flow sensor).

Figure 3:
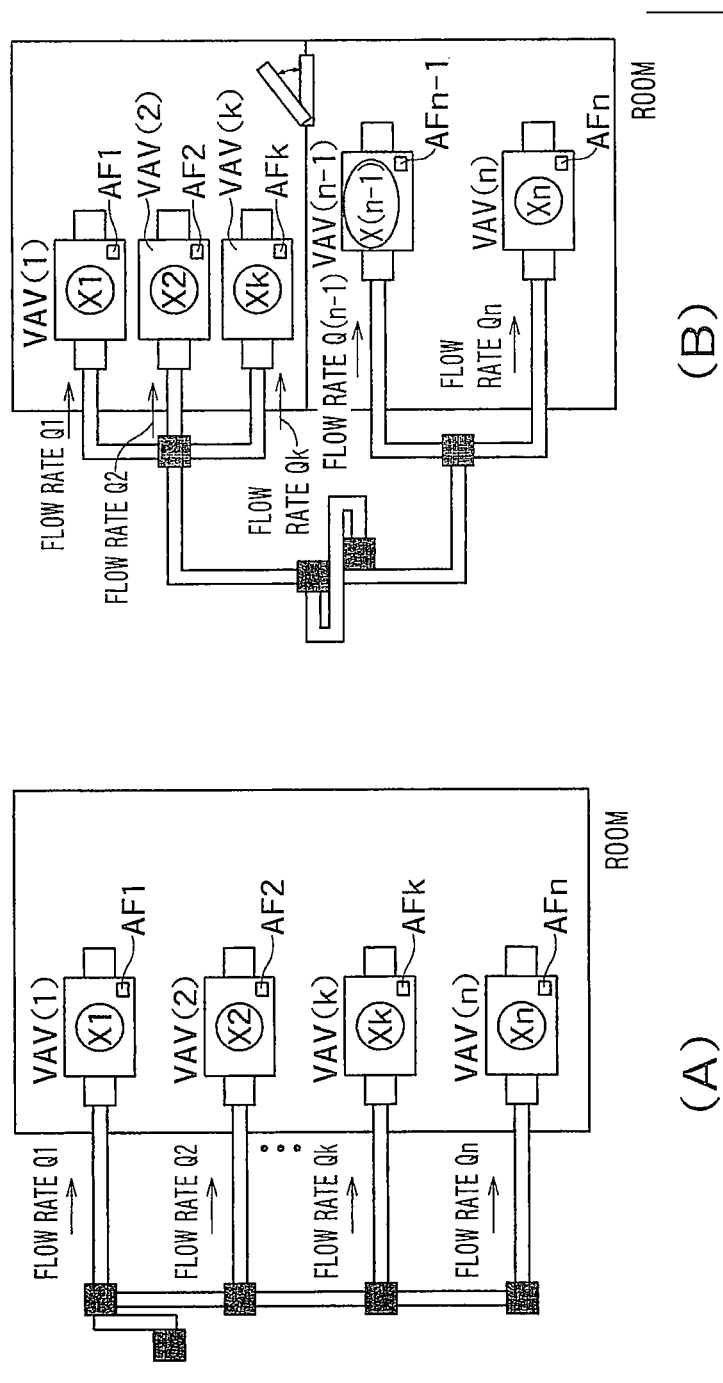
FIG. 3 is a diagram showing examples different from that in FIG. 2.

Note that the duct configuration is not limited to FIG. 2 and that various aspects are conceivable. For example, as in FIG. 3(A), the number of tributary ducts may be an arbitrary number "n" not less than 2. Alternatively, as in FIG. 3(B), the outlets of the branch ducts may be present in a plurality of rooms. In the example in FIG. 3(B), the rooms are adjacent to each other with an openable door or window between the rooms.

The anomaly detecting apparatus will be described in detail below with reference to FIG. 1.

An anomaly detecting apparatus 1 includes a model generator 11, a model optimizer 12, an anomaly detector 13, a target model storage 16, a reference time-series data storage (first storage) 17, a model storage 18, a time-series data storage (second storage) 19, a result storage 20, a sensor information storage (third storage) 21, a condition inputting section 15, and a display 16.

The components 11 to 13 are each realized by, e.g., causing a CPU to execute a program module. The CPU reads out a corresponding program module from a program storage (not shown), expands the program module in a memory, and executes the program module. The program storage can be realized by an arbitrary storage medium such as a hard disk device, a memory device, a CD-R, a DVD-R, a DVD-RW, or a flexible disk.

The components 16 to 21 are composed of an arbitrary storage medium such as a hard disk device, a memory device, a CD-R, or a DVD-ROM. The storage medium may be provided inside the anomaly detecting apparatus 1 or in a detachable external device.

The condition inputting section 15 is an input interface for a user to input data and can be composed of an arbitrary input unit such as a keyboard or a mouse.

The display 16 is an output interface for a user and can be composed of an arbitrary display device such as a liquid crystal display device, a plasma display device, an organic EL display device, or a CRT device. The display 16 displays, for example, data specified by the model generator 11 or the anomaly detector 13. If the display has a touch panel function, the condition inputting section 15 may include a corresponding touch panel function.

The present apparatus will be described below in the order of model generation, model optimization, and anomaly detection.

[Model Generation]

Figure 4:
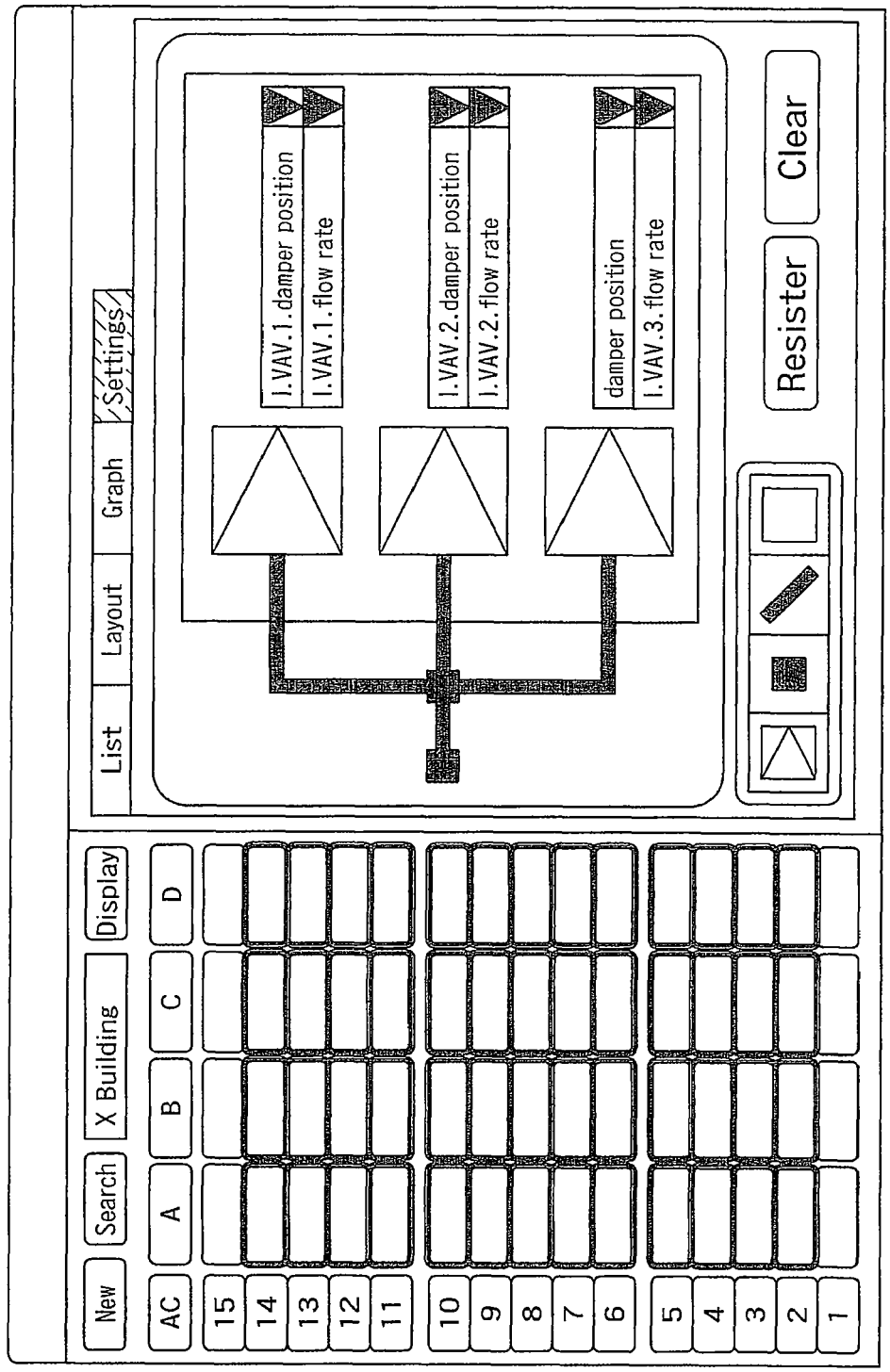
FIG. 4 is a view showing an example of an input screen.

FIG. 4 shows an example of an input screen for inputting through the condition inputting section 15.

On the left side of the input screen, rooms A to D on each of the second to 14-th floors as floors in X Building as a building are selected. Note that the number of floors to be selected and the number of rooms to be selected may be one. On the right side of the input screen, parameters for a sensor and an actuator in a room, for which anomaly detection is to be performed, are set. In the shown example, common settings are made for each of the rooms A to D on the second to 14-th floors. The example in FIG. 2 is assumed here. Three branch ducts are present, a VAV damper position and a flow rate are selected as observation parameters for each of VAV1 to VAV3 arranged for the respective branch ducts.

With the above-described input through the condition inputting section 15, a point object name is set in the following format:
<building ID.floor ID.point category.point subcategory.point ID.state quantity>.

The point object name includes six fields delimited with delimiters ("." in this example).

The building ID indicates an ID of a selected building.

The floor ID indicates an ID identifying a selected floor and a selected room.

The point category indicates a location type in the room. For example, "I" (Interior) represents the interior of a room while "P" (Perimeter) represents a location at the window.

The point subcategory indicates a device type. For example, device types include VAV and CAV.

The point ID indicates an ID of a device specified by the point subcategory.

The state quantity indicates a physical quantity or an instruction value observed for the specified device.

In the example in FIG. 4, for example, <X Building.12C.I.VAV.1.damper position> and <X Building.12C.I.VAV.1.flow rate> are set for the first branch duct (or the first VAV) of the room C on the 12th floor of X Building.

For the second branch duct (or the second VAV), <X Building.12C.I.VAV.2.damper position> and <X Building.12C.I.VAV.2.flow rate> are set.

For the third branch duct (or the third VAV), <X Building.12C.I.VAV.3.damper position> and <X Building.12C.I.VAV.3.flow rate> are set.

The reference time-series data storage (first storage) 17 in FIG. 1 stores, in advance, an index table and a data table.

FIG. 5 shows an example of an index table 171.

The index table 171 is composed of a handle ID and a point object name. The index table 171 stores, for example, all point object names that can be set on the input screen in FIG. 4 and their handle IDs.

FIG. 6 shows an example of a data table 172.

The data table 172 stores, for each handle ID of the index table 171, a history of observed values from a sensor/actuator specified by a corresponding point object name as pieces of reference time-series data (first time-series data). The pieces of reference time-series data (first time-series data) stored in the data table 172 are all acquired during a first period when the sensor/actuator is normal. Respective observed values corresponding to handle IDs are simultaneously recorded at fixed time intervals (intervals of 10 minutes in this example).

The target model storage 16 stores a plurality of target models to which Expression 1 below is applicable in a building air conditioning system. A target model is applicable to a partial structure (between arbitrary two control devices (or branch ducts) in the building air conditioning system in this example) in a system to be diagnosed.

$(C_i+\beta_i(X_i))\times(Q_i/Q_j)^2-(C_j+\beta_j(X_j))$ in Expression 1 corresponds to a target model. Note that "^" represents exponentiation. Expression 1 indicates that "$C_i$," "$C_j$," "$\beta_i$," and "$\beta_j$" in a target model are obtained so as to minimize the square ("R") of a value ("e") of the target model.

$$\min\_\{C_i, C_j, \beta_i, \beta_j\}$$

$$R=\{(C_i+\beta_i(X_i))\times(Q_i/Q_j)^2-(C_j+\beta_j(X_j))\}^2, \text{ where } C_i, C_j > 0 \quad \text{(Expression 1)}$$

$C_i$, $C_j$: constant term, $\beta_i$, $\beta_j$: unknown characteristic term, $X_i$: first observed variable, $Q_i$: second observed variable, $X_j$: third observed variable, $Q_j$: fourth observed variable Note that Expression 1a below that is more generalized than Expression 1 may be used. f(Y) in Expression 1a is a term representing an operation on the second and fourth observed variables and is a function in a known form. The function f(Y) may be described as f($Q_i$, $Q_j$). In this case, $(C_i+\beta_i(X_i))\times f(Y)-(C_j+\beta_j(X_j))$ corresponds to a target model.

$$\min\_\{C_i, C_j, \beta_i, \beta_j\}$$

$$R=(C_i+\beta_i(X_i))\times f(Y)-(C_j+\beta_j(X_j))^2 \quad \text{(Expression 1a)}$$

The target model included in Expression 1 above is obtained by modeling the energy conservation law for a medium (fluid or gas) flowing through two arbitrary branch ducts. The energy conservation law is indicated by Expression 1b below. A process of deriving a target model will be simply described in the context of a duct configuration as in FIG. 2 in which three VAVs are arranged.

$$Q_j^2=[(K_{i1}+K_{i2}v_i^{-2})/(K_{j1}+K_{j2}v_j^{-2})]Q_i^2 \quad \text{(Expression 1b)}$$

"$K_{i1}$," "$K_{i2}$," "$K_{j1}$," and "$K_{j2}$" are each a constant representing a pressure loss coefficient of a duct installed in an interior/perimeter area of a target zone.

"i" and "j" indicate two different branch ducts and are duct (or VAV) IDs.

"$K_{i1}$" and "$K_{j1}$" are each a pressure loss coefficient for a steady loss in a line extending from a branch point of branch ducts to a corresponding branch duct end (an inherent pressure loss coefficient of a branch duct).

"Ki2" and "Kj2" each indicate a pressure loss coefficient of a corresponding branch duct for a variable loss according to the position of a VAV in the branch duct.

"Qi" and "Qj" are each a flow rate measured value (m³/s) indicated by a flow sensor.

"vi" and "vj" are each a damper position (a real number of 0 to 1 (unitless)) for a valve adjusting the volume of duct air.

Expression 1b means that a VAV flow rate of the branch duct "j" can be estimated from a VAV instruction value (VAV position) and a VAV flow rate of the branch duct "i" and a VAV instruction value (VAV position) of the branch duct "j." Since the relational expression holds even if the number of VAVs changes and is little affected by disturbance, the relational expression is versatile.

With use of the parameters, Expression 1b is derived for arbitrary two branch ducts from Bernoulli's theorem. A process of deriving Expression 1b on the basis of Bernoulli's theorem will be omitted for illustrative simplicity. The generalized target model can be derived by transforming Expression 1b.

The expression below is obtained by transforming Expression 1b.

$$0 = (K_{i1} + K_{i2} v_i^{-2})(Q_i/Q_j)^2 - (K_{j1} + K_{j2} v_j^{-2})$$

Mathematically, a result of calculating a right-hand side is 0. However, a value of the right-hand side is actually not 0 due to variation in measured value, which causes an error.

Let "e" be the error, $$e = (K_{i1} + K_{i2} v_i^{-2})(Q_i/Q_j)^2 - (K_{j1} + K_{j2} v_j^{-2})$$

holds.

Additionally, if "$K_{i2} v_i^{-2}$" is changed to "$\beta_i(X_i)$" by generalization, and "$K_{j2} v_j^{-2}$," "$K_{i1}$," and "$K_{j1}$" are similarly changed to "$\beta_j(X_j)$," "$C_i$," and "$C_j$," respectively, $$e = (C_i + \beta_i(X_i))(Q_i/Q_j)^2 - (C_j + \beta_j(X_j))$$

is obtained. Moreover, if $(Q_i/Q_j)^2$ is replaced with f(Y), $$e = (C_i + \beta_i(X_i)) f(Y) - (C_j + \beta_j(X_j))$$

is obtained.

FIG. 7 is a view showing a plurality of examples of a target model stored in the target model storage 16.

Target models (entries) F-01, F-02, F-03, F-04, F-05, F-06, . . . are stored. A character string described in < > included in each target model is an abstract representation of a point object name.

Variables "[s1]," "[s2]," "[s3]," "[s4]," and "[s5]" are associated with arbitrary character strings, respectively. Note that if a variable occurs a plurality of times in one entry, the occurrences need to be associated with a single character string. For example, the target model F-01 has three occurrences of "[s1]," and the occurrences of "[s1]" need to be associated with a single character string.

The model generator 11 includes an input information analyzer 111 and an instance creator 112. The model generator 11 performs instance creation for Expression 1 on the basis of information (point object names) input through the condition inputting section 15 and the target model storage 16, using the components 111 and 112.

An instance here refers to assigning specific observed variables to the unprescribed observed variables "Xi," "Xj," "Qi," and "Qj" in Expression 1. Examples of an instance include assigning "X Building.2A.I.VAV.1.damper position" and "X Building.2A.I.VAV.1.flow rate" to "Xi" and "Qi," respectively, in Expression 1.

The details of processing by the model generator 11 will be described below with reference to FIG. 8.

Figure 8:
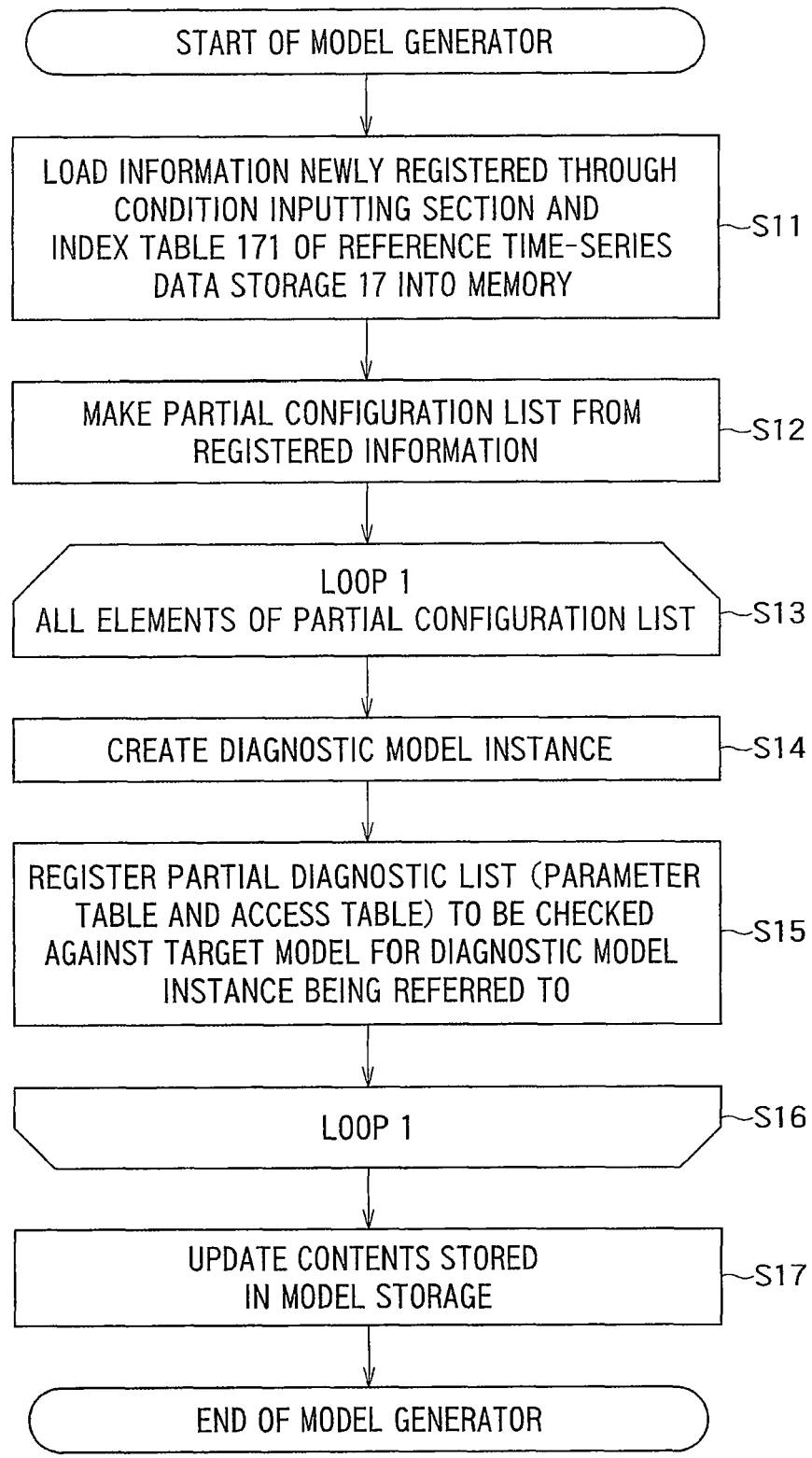
FIG. 8 is a flow chart showing a flow of processing by a model generator.

FIG. 8 is a flow chart showing a flow of the processing by the model generator 11.

A user's input of information through the condition inputting section 15 triggers the model generator 11 to start processing.

The input information loader 111 loads information (a plurality of point object names) registered through the condition inputting section 15 and the index table 171 of the reference time-series data storage 17 into the memory (S11).

The model generator 11 extracts top three pieces of information (building ID, floor ID, and point category ID) in each point object name and makes a list of elements (partial configuration list) including extracted top three pieces of information (S12).

In the case of the input example in FIG. 4, a partial configuration list including 52 elements such as {"X Building.2A.I," "X Building.2B.I," . . . , "X Building.14C.I," and "X Building.14D.I"} is made.

The model generator 11 executes Steps S13 to S16 below for each element in the partial configuration list.

In step S13, the model generator 11 selects an as-yet-unselected element from the partial configuration list.

In step S14, the model generator 11 creates a diagnosis model instance for the element selected in step S13 (S14).

For example, if the selected element is "X Building.2A.I," processing is performed in the manner below.

By enumeration of ones including the element "X Building.2A.I" among the point object names input through the condition inputting section 15, the six point object names below are obtained.

X Building.2A.I.VAV.1.damper position
X Building.2A.I.VAV.1.flow rate
X Building.2A.I.VAV.2.damper position
X Building.2A.I.VAV.2.flow rate
X Building.2A.I.VAV.3.damper position
X Building.2A.I.VAV.3.flow rate By checking the point object names against each model registered in the target model storage 16, the point object names are found to match the model F-01 below. The checking may be performed by string matching. That is, the model generator 11 selects a model in which variables such as "[s1]" and "[s2]" do not contradict each other (a single character string is put into occurrences of a variable).

F-01: (C1+β1(<[s1].[s2].[s3].VAV.[s4].damper position>))
*(<[s1].[s2].[s3].VAV.[s4].flow rate>/<[s1].[s2].[s3].VAV.[s5].flow rate>)²−(C2+β2(<[s1].[s2].[s3].VAV.[s5].damper position>))

In the model F-01, although "[s1]" to "[s3]" are uniquely determined, there are six combinations for "[s4]" and "[s5]."

More specifically, "[s1]," "[s2]," and "[s3]" are uniquely determined to be "X Building," "2A," and "I," respectively. In contrast, there are six combinations for "[s4]" and "[s5]", as described below. Note that "[s4]" and "[s5]" both correspond to point IDs.

([s4], [s5])=(1,2), (2,1), (1,3), (3,1), (2,3), and (3,2)

Accordingly, the six instances (diagnostic model instances)<1> to <6> below are obtained for the model F-01 (see FIG. 9).

TABLE 1

| Expression ID | s1 | s2 | s3 | s4 | s5 | |
|---|---|---|---|---|---|---|
| F-01 | X building. | 12C | I | 1 | 2 | <1> |
| F-01 | X building. | 12C | I | 2 | 1 | <2> |
| F-01 | X building. | 12C | I | 1 | 3 | <3> |

TABLE 1-continued

| Expression ID | s1 | s2 | s3 | s4 | s5 | |
|---|---|---|---|---|---|---|
| F-01 | X building. | 12C | I | 3 | 1 | <4> |
| F-01 | X building. | 12C | I | 2 | 3 | <5> |
| F-01 | X building. | 12C | I | 3 | 2 | <6> |

<1> and <2> are diagnostic model instances for the pair of VAV1 and VAV2, <3> and <4> are diagnostic model instances for the pair of VAV1 and VAV3, and <5> and <6> are diagnostic model instances for the pair of VAV2 and VAV3.

In step S15, the model generator 11 registers a partial diagnosis list (a parameter table and an access table) for being checked against a target model for each diagnostic model instance created in step S14.

The parameter table here is a table storing coefficients ("Ci," "Cj," "βi," and "βj") for each diagnostic model instance. An example of the parameter table is shown on the right side of FIG. 9 (linked to the "PARMS" attribute).

For example, a coefficient "C[3]" as a coefficient "C1" of F-01, a coefficient "C[2]" as a coefficient "C2" of F-01, a coefficient "β[3]" as a coefficient "β1" of F-01, and a coefficient "β[2]" as a coefficient "β2" of F-01 are stored for the bottom instance <6> in the table above. That is, "C[3], C[2], β[3], β[2]" is registered for the bottom instance in the parameter table so as to correspond to "C1," "C2," "β1," and "β2" of F-01 (or "Ci," "Cj," "βi," and "βj" in Expression 1). Note that at this point, values of the parameters are not identified (unknown).

In the same manner, parameters are registered for each of the remaining five instances <1> to <5>.

The access table stores an ID corresponding to an observed variable (damper position or flow rate) included in each diagnostic model instance. An example of the access table is shown on the right side of FIG. 9 (linked to the "ACCESS" attribute).

The access table is used for mapping to reference time-series data which is stored in the reference time-series data storage 17 and mapping to time-series data for use in abnormality diagnosis (to be described later) stored in the time-series data storage 19.

For example, in the case of the instance <6>, there are four observed variables:
  <X Building.12C.I.VAV.3.damper position>,
  <X Building.12C.I.VAV.2.damper position>,
  <X Building.12C.I.VAV.3.flow rate>, and
  <X Building.12C.I.VAV.2.flow rate>.

Handle IDs corresponding to the observed variables are 135, 134, 145, and 144 (see the index table 171 in FIG. 5). Accordingly, "135, 134, 145, 144" are registered for the above instance <6> in the access table.

The above-described processes in steps S14 and S15 are similarly performed for the remaining elements of the partial configuration list.

When processing for all the elements included in the partial configuration list is over, a model list including a piece of model information for each combination of the floors and rooms of the building is stored in the model storage 18 (step S17).

Figure 9:
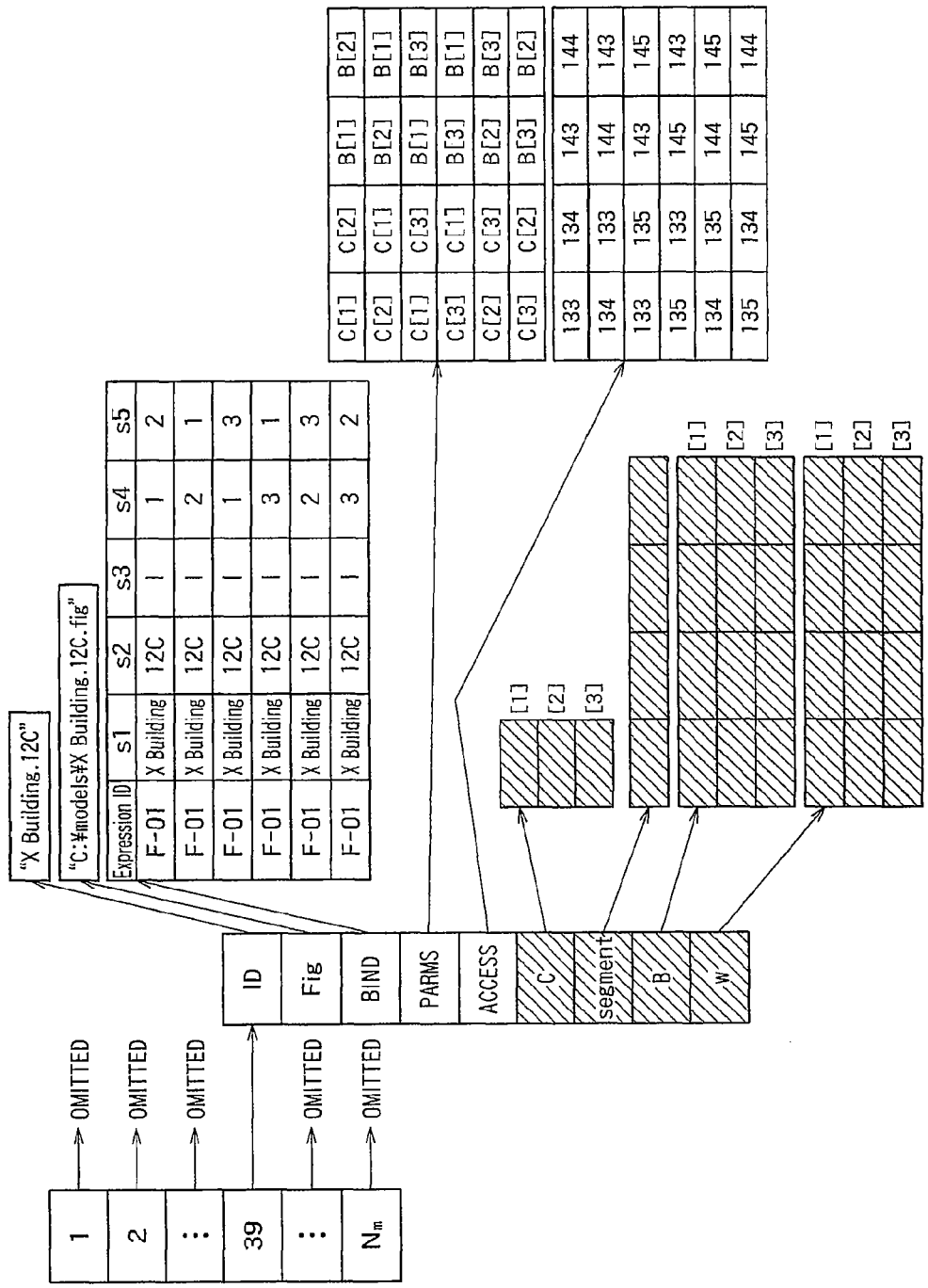
FIG. 9 is a diagram showing a model list which is an output of the model generator.

The model list is an output of the model generator and is shown in FIG. 9.

An example of a piece of model information generated for "12C" (the room C on the 12th floor) is shown on the right side of FIG. 9. A piece of model information in the same format is present for each of the remaining combinations of the floors and rooms. A collection of these pieces of model information corresponds to the model list.

Figure 10:
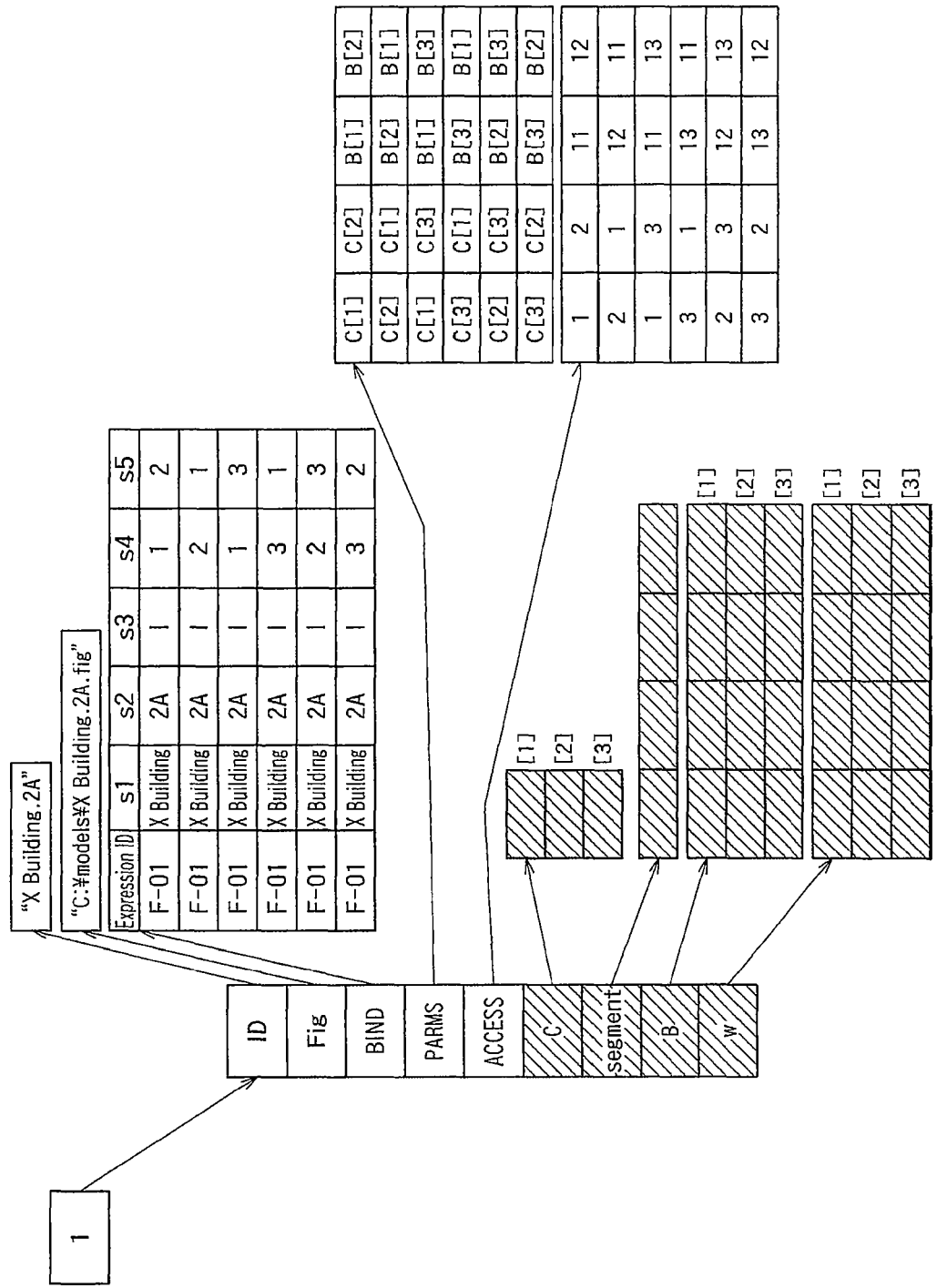
FIG. 10 is a diagram showing an example of a piece of model information.

As shown in FIG. 9, the model list includes pieces of model information for the rooms on the floors selected by the condition inputting section, and numbers of 1 to "Nm" are the numbers of the pieces of model information. A number is set for each combination of building IDs and floor IDs. A number to be set increases from 1 to "Nm" each time a piece of model information is generated. FIG. 10 shows an example of a piece of model information generated for "2A" (the room A on the second floor). Since the piece of model information for "2A" is first created in the above-described process flow, the number of 1 is assigned. At this time, there are no other pieces of model information. Generation of the piece of model information for "12C" is performed 39th, and the number of 39 is assigned (see FIG. 9). Note that in this example, the last number "Nm" is 52.

A piece of model information has the attributes below: "ID," "Fig," "BIND," "PARMS," "ACCESS," "C," "segment," "B," and "w."

For example, the number of the piece of model information for the room C on the 12th floor of X Building is 39, and "ID" indicates a link to the identifier "X Building.12C" of the piece of model information.

"Fig" indicates a link to a file storing screen data of the input screen by the condition inputting section 15.

"BIND" indicates a link to the diagnostic model instances described above.

As described earlier, "PARMS" is linked to the parameter table, and "ACCESS" is linked to the access table.

At this time, nothing is set for the "C" (constant term), "segment" (segment), "B" (unknown characteristic term), and "w" (confidence value) attributes. The details will be described later.

Note that although the input screen in FIG. 4 shows a case where all fall under the point category of "I," "I" and "P" may be both present in one room. In this case, processing is performed separately for "I" and "P" (as described above, matching against target models is performed using top three pieces of information (building ID, floor ID, and point category ID) in each point object name. Accordingly, in this case, a piece of model information is generated for each of "I" and "P" in one room (e.g., the room C on the 12th floor).

[Model Optimization]

The model optimizer 12 in FIG. 1 includes a data loader 121, an unknown characteristic term initial calculator 122, a constant term convergence calculator 123, and an unknown characteristic term convergence calculator 124.

The model optimizer 12 learns, for each piece of model information, parameters of a diagnostic model instance so as to minimize the square ("R" in Expression 1) of a value of the diagnostic model instance for the reference time-series data stored in the reference time-series data storage 17.

The data loader 121 loads pieces of reference time-series data stored in the reference time-series data storage 17 into the memory.

The unknown characteristic term initial calculator 122 fixes constant terms included in each diagnostic model instance and, under the condition that unknown characteristic terms is common to each other, identifies the unknown characteristic terms so as to minimize the square of an error (a value of the diagnostic model instance) for the reference time-series data loaded into the memory, and stores the unknown characteristic terms in the memory.

The constant term convergence calculator 123 fixes the unknown characteristic terms stored in the memory at the current state, identifies the constant terms so as to minimize the square of an error for the reference time-series data loaded into the memory, and stores the constant terms in the memory.

The unknown characteristic term convergence calculator 124 fixes the constant terms stored in the memory at the current state, identifies the unknown characteristic terms so as to minimize an error for the reference time-series data loaded into the memory, and stores the unknown characteristic terms in the memory.

The constant term convergence calculator 123 and unknown characteristic term convergence calculator 124 alternate processing with each other until an end condition is satisfied. When the end condition is satisfied, parameters are stored in the model storage 18. Diagnostic model instances in which parameters obtained in the above-described manner are set are referred to as optimized diagnostic model instances.

Figure 11:
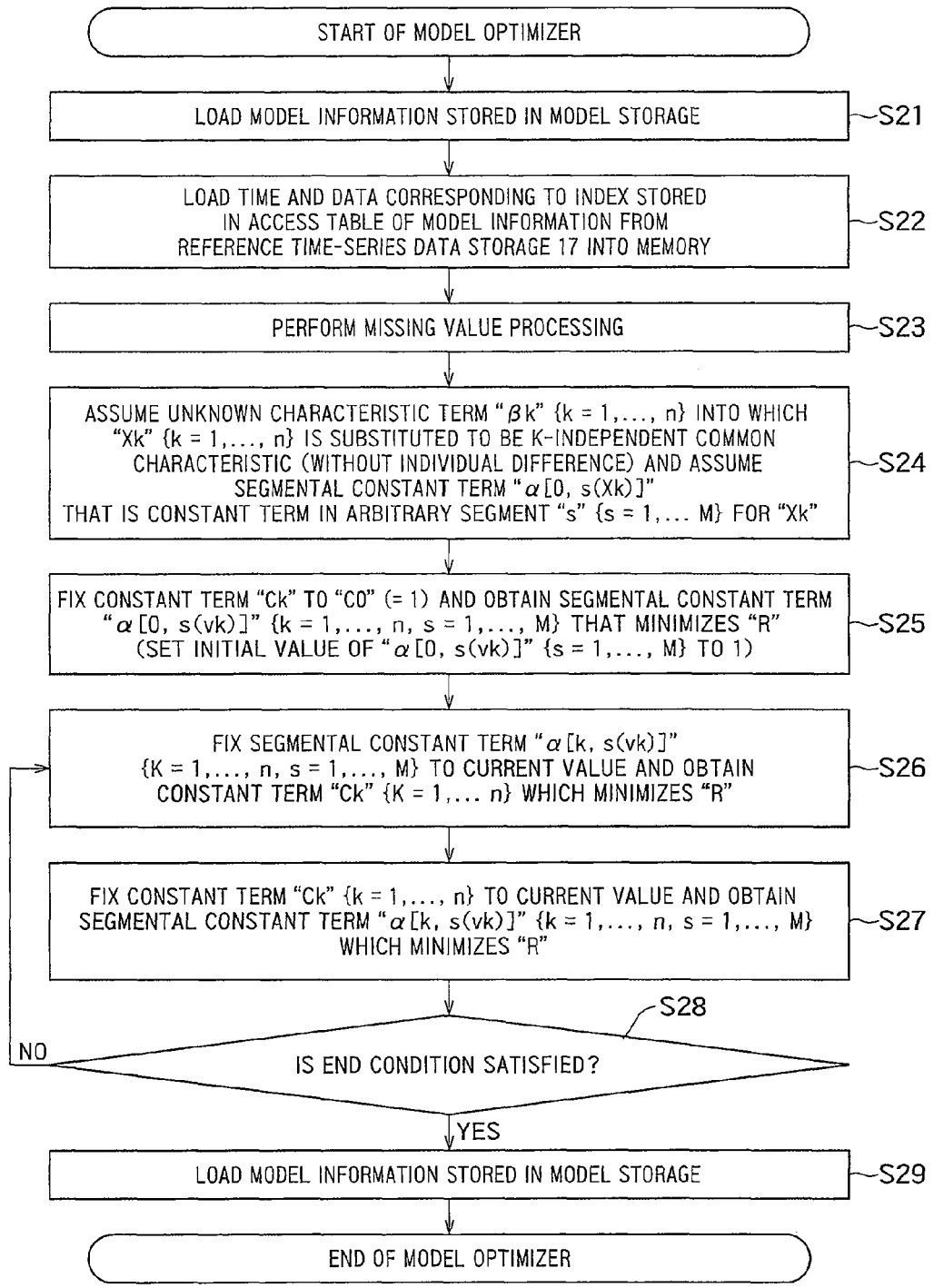
FIG. 11 is a flow chart showing a flow of processing by a model optimizer.

FIG. 11 is a flow chart showing a flow of processing by the model optimizer 12. The model optimizer 12 is executed after the model generator 11. Accordingly, before execution of the model optimizer 12, pieces of model information for rooms on floors selected by a user in X Building are stored in the model storage 18.

The data loader 121 first executes the processes below in steps S21 to S23.

The data loader 121 loads a piece of model information with an arbitrary number in a model list stored in the model storage 18 into the memory (S21). For example, the data loader 121 loads the piece of model information for "the room C on the 12th floor in X Building" with the number of 39.

The data loader 121 loads, for each of diagnostic model instances included in the loaded piece of model information, corresponding data (observed values corresponding to handle IDs of the "ACCESS" attribute and time stamps (time information)) from the reference time-series data in the reference time-series data storage 17 into the memory, using the "ACCESS" attribute (S22).

The data loader 121 performs missing value processing on the data loaded in step S22 (S23). The missing value processing is performed by an existing method. For example, it is desirable to use a modified median filter which does not make a major change to input data, has a relatively high capability of removing a missing value and an outlier, and has low computational complexity.

The unknown characteristic term initial calculator 122, constant term convergence calculator 123, and unknown characteristic term convergence calculator 124 perform steps S24 to S28.

The unknown characteristic term initial calculator 122 performs step S24. Since $\beta k(X)$ that is an unknown characteristic term is not given by a prescribed function, $\beta k(X)$ is replaced with $\alpha[k, s(X)]$. $\alpha[k, s(X)]$ is a function that provides a constant for each of M segments with a given width into which a domain of "X" is divided.

That is, s(X) is a function that returns an index to a segment to which "X" belongs when "X" is given and outputs any one of natural numbers of 1 to "M" for the provided "X" ("M": the number of segments). "k" is an unknown characteristic term identifier corresponding to "i" or "j" in Expression 1. Accordingly, "$\alpha[k, s(X)]$" returns a constant in a segment to which "X" belongs when "X" is provided.

With use of the above-described replacement, Expression 1 that is an expression indicating optimization can be represented by Expression 2 below.

$$\min\_\{C[i], C[j], \alpha[i,1], \ldots, \alpha[i,M], \alpha[j,1], \ldots, \alpha[j,M]\}$$

$$R=\{(C[i]+\alpha[i,s(Xi)]) \times (Qi/Qj)^2 - (C[j]+\alpha[j,s(Xj)])\}^2, i \neq j \quad \text{(Expression 2)}$$

Expression 2 means obtaining a total of (2×M+2) parameters, "C[i]," "C[j]," "$\alpha[i,1]$," ..., "$\alpha[i,M]$," "$\alpha[j,1]$," ..., "$\alpha[j,M]$" so as to minimize "R" (performing optimization). The limiting conditions are that C[i]>0 and that C[j]>0.

Solving the expression at one time is difficult. As one method for solving such an expression, a process of solving the expression by performing iterative operation while switching a target variable to be fixed from one to the other and a target variable to be optimized from the other to the one is known. Here, Expression 2 is solved by iterative operation of three steps by Expression 3, Expression 4, and Expression 5 below.

$$\min\_\{\alpha[0,1], \ldots, \alpha[0,M]\}$$

$$R=\{(C0+\alpha[0,s(Xi)])^*(Qi/Qj)^2 - (C0+\alpha[0,s(Xj)])\}^2 \quad \text{(Expression 3)}$$

$$\min\_\{C[i], C[j]\}$$

$$R=\{(C[i]+\alpha[i,s(Xi)])^*(Qi/Qj)^2 - (C[j]+\alpha[j,s(Xj)])\}^2 \quad \text{(Expression 4)}$$

$$\min\_\{\alpha[i,1], \ldots, \alpha[i,M], \alpha[j,1], \ldots, \alpha[j,m]\}$$

$$R=\{(C[i]+\alpha[i,s(Xi)])^*(Qi/Qj)^2 - (C[j]+\alpha[j,s(Xj)])\}^2 \quad \text{(Expression 5)}$$

(Step 1) A first step is to solve Expression 3.1 below that is an instance of Expression 3 in the unknown characteristic term initial calculator 122 (S25).

$$\min\_\{\alpha[0,1], \ldots, \alpha[0,M]\}$$

$$R=\{(C0+\alpha[0,s(xi)]) \times (Qi/Qj)^2 - (C0+\alpha[0,s(xj)])\}^2, i \neq j \quad \text{(Expression 3.1)}$$

(Expression 3.1) will be described below according to an example.

Assume that "C1," "C2," and "C3" corresponding to inherent duct pressure loss coefficients of three branch ducts have a same value "C0" (=1). That is, assume that the lengths of, shapes of, and materials for ducts in the branch ducts are same. Note that "C1," "C2," and "C3" can be said to be unknown constant terms corresponding to locations (ducts) where VAV1 to VAV3 are arranged.

Additionally, assume that "$\alpha[1,1:M]$," "$\alpha[2,1:M]$," and "$\alpha[3,1:M]$" corresponding to duct pressure loss coefficients estimated from damper positions for VAV1 to VAV3 have no individual differences between devices and have a common branch duct pressure loss coefficient "$\alpha[0,1:M]$" (i.e., "$\alpha[0,1]$," ..., "$\alpha[0,M]$"). That is, assume that "$\alpha[1,1]$," "$\alpha[2,1]$," "$\alpha[3,1]$" all have a same value of "$\alpha[0,1]$," that "$\alpha[1,2]$," "$\alpha[2,2]$," "$\alpha[3,2]$" all have a same value of "$\alpha[0,2]$," ..., and that "$\alpha[1,M]$," "$\alpha[2,M]$," "$\alpha[3,M]$" all have a same value of "$\alpha[0,M]$."

At this time, "$\alpha[0,1:M]$" corresponding to the common branch duct pressure loss coefficient is obtained so as to minimize a square error for the data loaded from the reference time-series data storage 17.

More specifically, corresponding pieces of data loaded from the reference time-series data storage 17 are substituted into Expression 3.1 for each of the diagnostic model instances <1> to <6>. As shown below, nonlinear simultaneous equations (Expressions 3.2), the number of which is equal to the number of pieces of data (="n")×6, are set up. By solving the nonlinear simultaneous equations using an existing solver, "$\alpha[0,1:M]$" (="$\alpha[0,1]$," ..., "$\alpha[0,M]$") is obtained (S24 to S25). That is, "$\alpha[0,1:M]$" (="$\alpha[0,1]$," ..., "$\alpha[0,M]$") is obtained by performing optimization such that left-hand sides of the equations are simultaneously as close to 0 as possible. In Expressions 3.2, "a" in "R[a,b]" is a number for identifying a diagnostic model instance, and "b" is a number for identifying one of "n" pieces of data.

$\{(C0 + \alpha[0, s(x1[1])]) \times (Q1[1]/Q2[1])^{\wedge}2 -$ (Expression 3.2)

$(C0 + \alpha[0, s(x2[1])])\}^{\wedge}2 - R[1, 1] = 0$

...

$\{(C0 + \alpha[0, s(x1[n])]) \times (Q1[n]/Q2[n])^{\wedge}2 -$ $(C0 + \alpha[0, s[x2[n]])\}^{\wedge}2 - R[1, n] = 0$ $\{(C0 + \alpha[0, s(x1[1])]) \times (Q1[1]/Q3[1])^{\wedge}2 -$ $(C0 + \alpha[0, s(x3[1])])\}^{\wedge}2 - R[2, 1] = 0$

...

$\{(C0 + \alpha[0, s(x1[n])]) \times (Q1[n]/Q3[n])^{\wedge}2 -$ $(C0 + \alpha[0, s(x3[n])])\}^{\wedge}2 - R[2, n] = 0$ $\{(C0 + \alpha[0, s(x2[1])]) \times (Q2[1]/Q1[1])^{\wedge}2 -$ $(C0 + \alpha[0, s(x1[1])])\}^{\wedge}2 - R[3, 1] = 0$

...

$\{(C0 + \alpha[0, s(x2[n])]) \times (Q2[n]/Q1[n])^{\wedge}2 -$ $(C0 + \alpha[0, s(x1[n])])\}^{\wedge}2 - R[3, n] = 0$

...

$\{(C0 + \alpha[0, s(x3[1])]) \times (Q3[1]/Q2[1])^{\wedge}2 -$ $(C0 + \alpha[0, s(x2[1])])\}^{\wedge}2 - R[6, 1] = 0$

...

Figure 13:
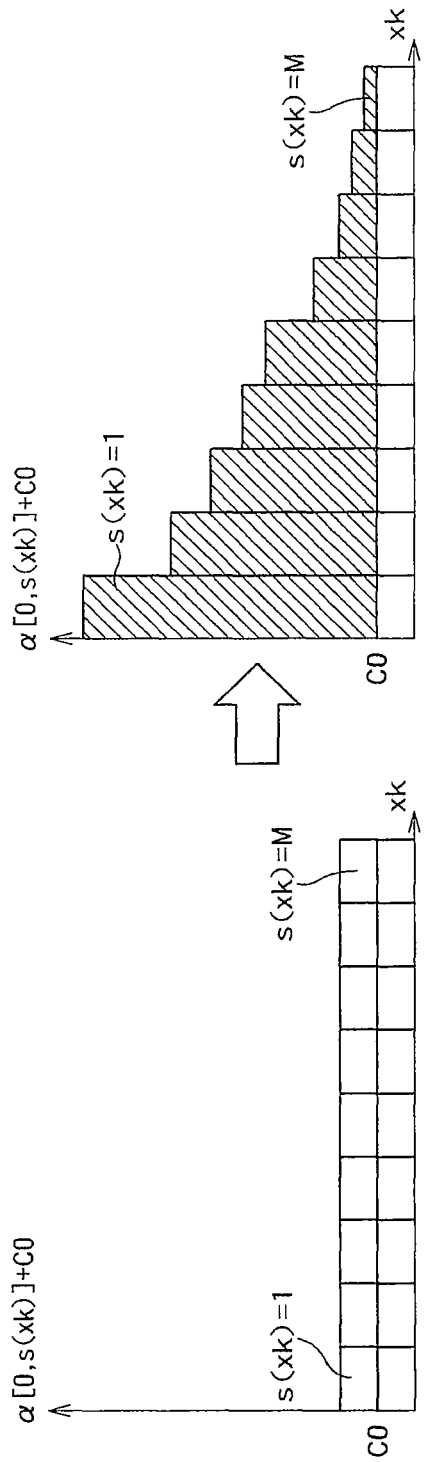
FIG. 13 is a chart showing how parameter identification calculation is performed.

$\{(C0 + \alpha[0, s(x3[n])]) \times (Q3[n]/Q2[n])^{\wedge}2 -$ $(C0 + \alpha[0, s(x2[n])])\}^{\wedge}2 - R[6, n] = 0$ FIG. 13 shows memory contents in the calculation 25 processes in steps 1 to 3 (S25 to S27).

As shown on the left side of FIG. 13, "C1," "C2," and "C3" are fixed at the same value "C0" (=1), and an initial value of "α[0,1:M]" (="α[0,1]," . . . , "α[0,M]") is set to 1. As shown on the right side of FIG. 13, "α[0,1:M]" (="α[0,1]," . . . , "α[0,M]") is obtained by solving Expression 3.2 above. The X-axis represents VAV damper position while the Y-axis represents α[0, s(xk)]+C0.

Figure 12:
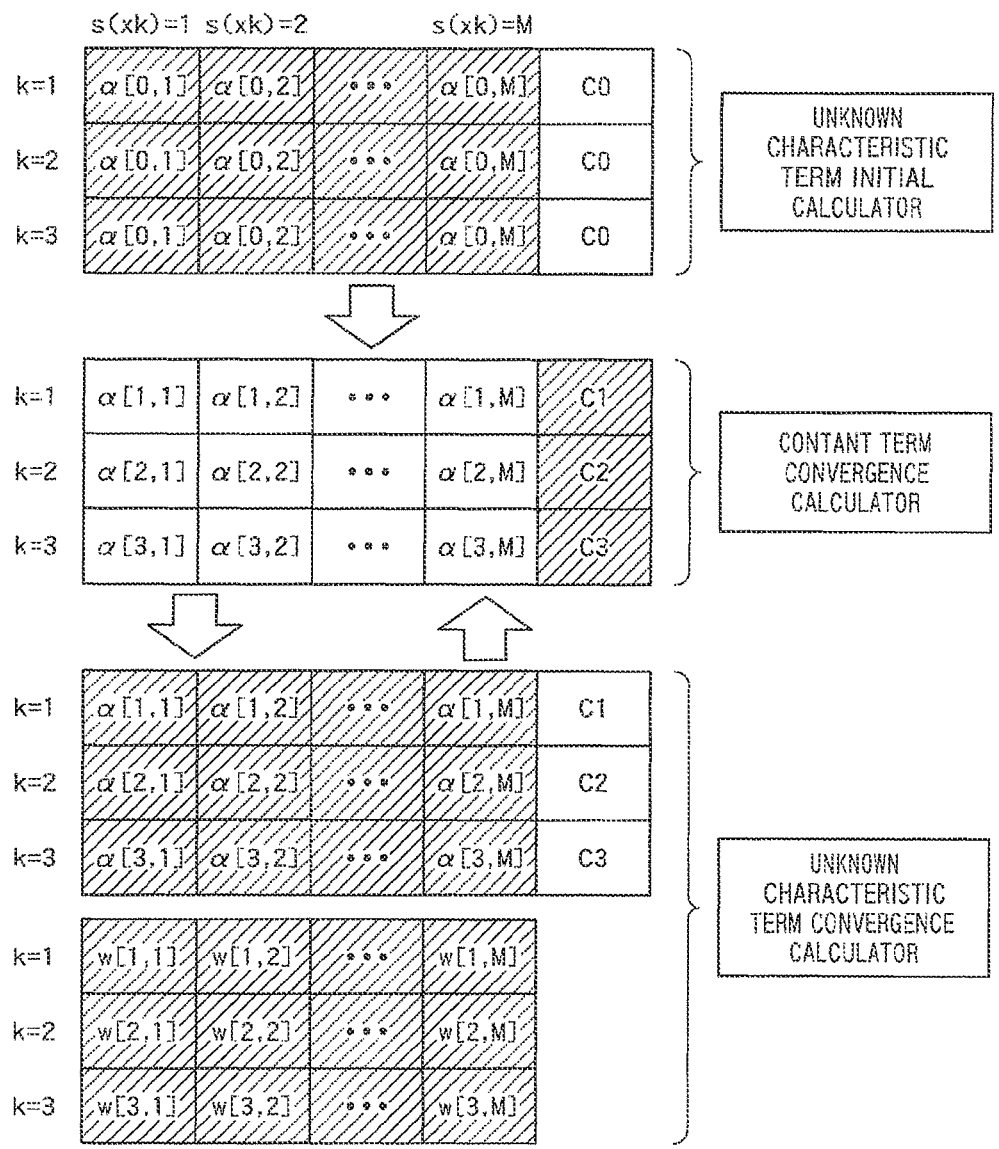
FIG. 12 is a diagram showing memory contents in a parameter identification calculation process in FIG. 11.

FIG. 12 shows memory contents in the calculation processes in steps 1 to 3 (S25 to S27). Variables to be optimized are held as an array table in the memory. The memory contents in step 1 are shown in a top portion in FIG. 12. Variables in shaded cells are optimized while variables in white cells are fixed. In this step 1, as described above, "C1," "C2," and "C3" are fixed at the same value "C0" (=1) (white cells). "α[0,1:M]" is optimized on the assumption that "α[1,1:M]," "α[2,1:M]," "α[3,1:M]" have the common "α[0,1:M]" (shaded cells).

(Step 2) A second step is to solve Expression 4.1 below that is an instance of Expression 4 in the constant term convergence calculator 123 (S26).

$\min\_\{C[i], C[j]\}$ $R=\{(Ci+\alpha[i,s(xi)])\times(Qi/Qj)^{\wedge}2-(Cj+\alpha[j,s(xj)])\}^{\wedge}2, i\neq j$ (Expression 4.1)

(Expression 4.1) will be described below according to an example.

"α[1,1:M]," "α[2,1:M]," and "α[3,1:M]" corresponding to pressure loss coefficients for the position of VAV1 to VAV3 are fixed at the current state (as described above, "α[1,1:M]," "α[2,1:M]," and "α[3,1:M]" are all initially set to "α[0,1:M]"). "C1," "C2," and "C3" corresponding to the duct pressure loss coefficients for the branch ducts are obtained so as to minimize the square error of the pieces of data loaded from the reference time-series data storage 17.

As in step 1, simultaneous equations, the number of which is equal to the number of pieces of data (="n")×6, are set up by inputting the loaded pieces of data for each of the diagnostic model instances <1> to <6>. By solving the simultaneous equations using an existing solver, "C1," "C2," and "C3" are obtained (S26).

Figure 14:
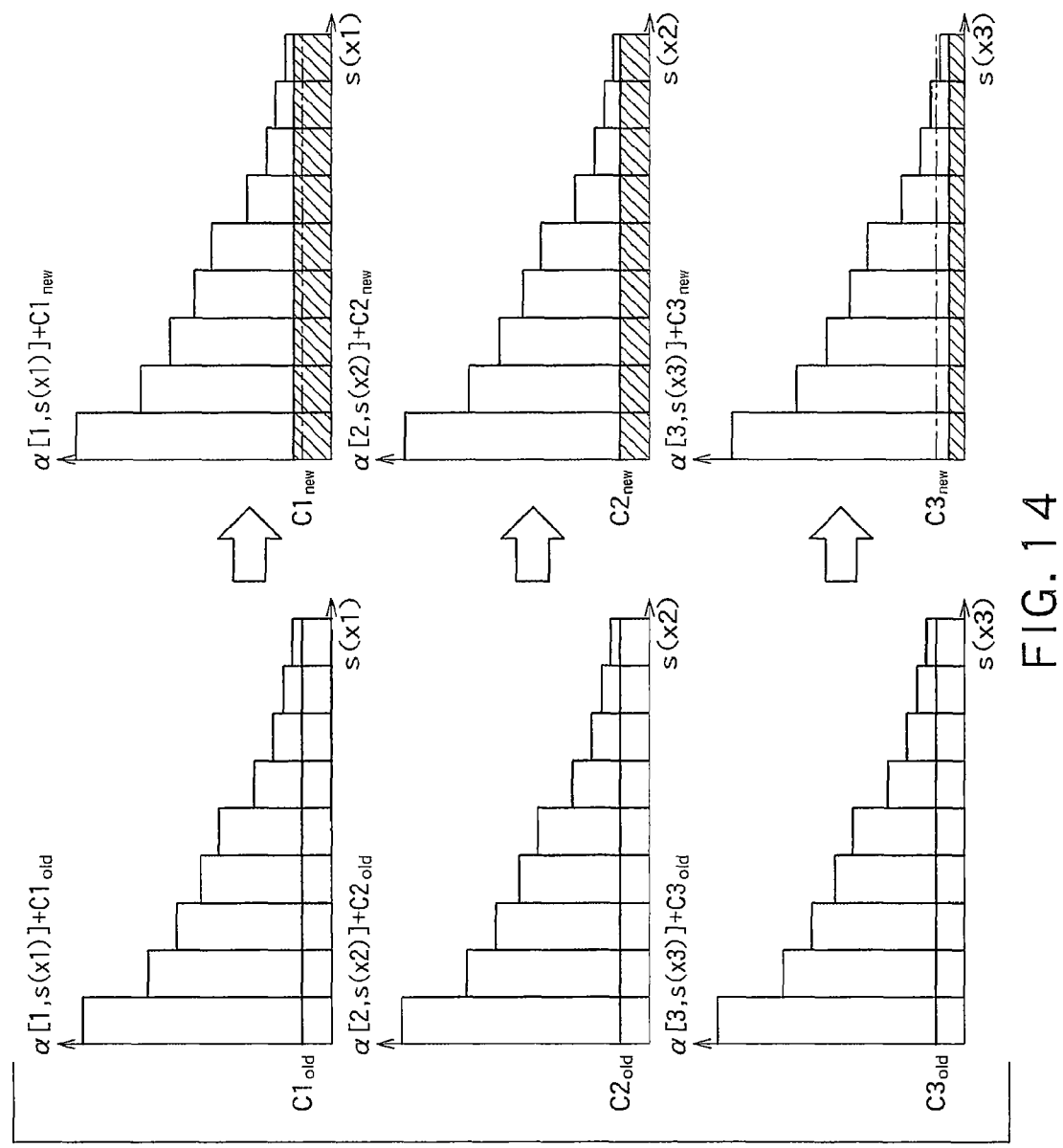
FIG. 14 is a chart showing how the parameter identification calculation is performed.

FIG. 14 shows how calculation is performed in this step 2 (S26).

"$C1_{old}$," "$C2_{old}$," and "$C3_{old}$" on the left side of FIG. 14 are "C1," "C2," and "C3" before optimization by this step while "$C1_{new}$," "$C2_{new}$," and "$C3_{new}$" on the right side of FIG. 14 are "C1," "C2," and "C3" after the optimization by this step.

"α[k, s(xk)]" corresponding to each branch duct (i.e., "α[1, s(x1)]," "α[2, s(x2)]," and "α[3, s(x3)]") is fixed in this step.

Note that the X-axis represents VAV damper position. More specifically, "x1" is a damper position of VAV1, "x2" is a damper position of VAV2, and "x3" is a damper position of VAV3. The Y-axis represents a[k, s(x)]+Ck.

The memory contents in step 2 (S26) is shown in a second portion from the top in FIG. 12. Variables in shaded cells are optimized while variables in white cells are fixed. In this step 2, as described above, "C1," "C2," and "C3" are optimized while "α[1,1:M]," "α[2,1:M]," and "α[3,1:M]" are fixed.

(Step 3) A third step is to solve Expression 5.1 below that is an instance of Expression 5 in the unknown characteristic term convergence calculator 124.

$\min\_\{\alpha[i,1], \ldots, \alpha[i,M], \alpha[j,1], \ldots, \alpha[j,M]\}$ $R=\{(C[i]+\alpha[i,s(xi)])\times(Qi/Qj)^{\wedge}2-(C[j]+\alpha[j,s(xj)])\}^{\wedge}2, i,$
$j=1,\ldots,3, i\neq j$ (Expression 5.1)

(Expression 5.1) will be described below according to an example.

"C1," "C2," and "C3" corresponding to the duct pressure loss coefficients of the branch ducts are fixed at the current states (the values obtained in S26). "α[1,1:M]" (="α[1,1]," . . . , "α[1,M]"), "α[2,M]" (="α[2,1]," . . . , "α[2,M]"), and "α[3,1:M]" (="α[3,1]," . . . , "α[3,M]") corresponding to the duct pressure loss coefficients for the damper positions of VAV1 to VAV3 so as to minimize the square error of the pieces of data loaded from the reference time-series data storage 17. More specifically, as described earlier, simultaneous equations, the number of which is equal to the number of pieces of data (="n")×6, are set up by inputting the loaded pieces of data for each of the diagnostic model instances <1> to <6>. By solving the simultaneous equations using an existing solver, "α[1,1:M]," "α[2,1:M]," and "α[3,1:M]" are obtained (S27).

Figure 15:
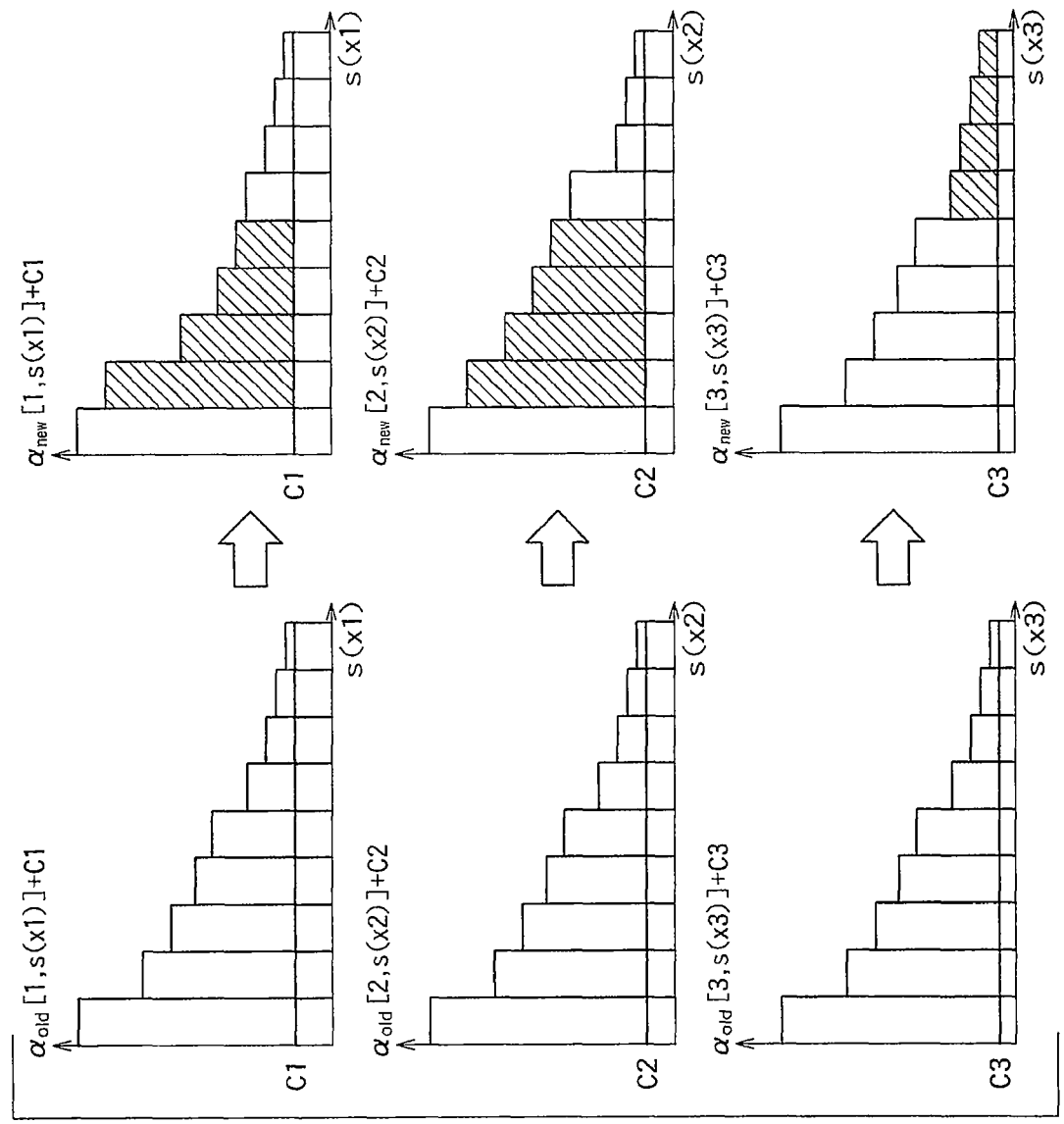
FIG. 15 is a chart showing how the parameter identification calculation is performed.

FIG. 15 shows how calculation is performed in this step 3 (S27).

"$\alpha_{old}[1, s(x1)]$," "$\alpha_{old}[2, s(x2)]$," and "$\alpha_{old}[3, s(x3)]$" on the left side of FIG. 15 are "α[1,s(x1)]," "α[2,s(x2)]," and "α[3, s(x3)]" before optimization by this step while "$\alpha_{new}[1, s(x1)]$," "$\alpha_{new}[2, s(x2)]$," and "$\alpha_{new}[3, s(x3)]$" are "α[1, s(x1)]," "α[2, s(x2)]," and "α[3, s(x3)]" after the optimization by this step.

"C1," "C2," and "C3" corresponding to the branch ducts are fixed in this step.

Note that each shaded block on the right side of FIG. 15 indicates that there is a change in a value of "α[k, s(x)]" between before and after optimization and that each unshaded block indicates that there is no change in the value of "α[k, s(x)]" between before and after optimization.

The memory contents in this step 3 (S27) are shown in a second portion from the bottom in FIG. 12. Variables in shaded cells are optimized while variables in white cells are fixed. In this step 3, as described above, "α[1,1:M]," "α[2,1:M]," and "α[3,1:M]" are optimized while "C1," "C2," and "C3" are fixed.

In step S27, the processing below may be performed in order to increase the reliability of abnormality determination (to be described later).

If a joint distribution of VAV damper positions included in the data loaded into the memory in step S22 has a low-density region, deviation of a partial solution "α[k,s]" obtained from data for the low-density region from a value to be truly obtained may be large. If the deviation is large, an error is likely to occur in abnormality determination in the anomaly detector 13 (to be described later). For this reason, a confidence value "w[k,s]" for "α[k,s]" is set such that processing based on the reliability of "α" can be performed in later abnormality determination.

More specifically, a confidence value "w[1,1:M]" (="w[1,1]," "w[1,2]," ..., "w[1,M]")) is calculated for "α[1,1:M]" (="α[1,1]," "α[1,2]," ..., "α[1,M]"), a confidence value "w[2,1:M]" (="w[2,1]," "w[2,2]," ..., "w[2,M]")) is calculated for "α[2,1:M]" (="α[2,1]," "α[2,2]," ..., "α[2,M]"), a confidence value "w[3,1:M]" (="w[3,1]," "w[3,2]," ..., "w[3,M]")) is calculated for "α[3,1:M]" (="α[3,1]," "α[3,2]," ..., "α[3,M]").

At this time, a confidence value is set so as to increase with an increase in the number of pieces of data belonging to a segment "s" (=1, 2, ..., M). For example, a confidence value of a section is calculated by preparing a function or a table which provides a higher confidence value for a larger number of data and providing the number of pieces of data belonging to the segment to the function or the table.

The memory contents when confidence value calculation is performed in this step S27 are shown in a bottom portion of FIG. 12. Note that confidence value calculation only needs to be performed once and need not be repeatedly performed each time step S27 is executed.

By repeatedly executing steps 2 and 3 (S26 and S27 in FIG. 11) described above until an end condition is satisfied (S28), an environment-responsive, unique constant term "Ck" (k=1, 2, 3) (e.g., a pressure loss coefficient unique to a branch duct) and a device-specific, unknown characteristic term "α[k, s(xk)]" (k=1, 2, 3, s(xk)=1, 2, 3, ..., M) (e.g., a pressure loss coefficient estimated from a VAV damper position) can be obtained.

The end condition is determined on the basis of a used solver. Examples of the end condition are that "the solver has converged on a solution," that "a change in a target variable is smaller than an allowable range," and that "the number of iterative calculations has reached a maximum number."

When the end condition is satisfied, "Ck" (k=1, 2, 3) and "α[k, s(xk)]" (k=1, 2, 3, s(xk)=1, 2, 3, ..., M)) are stored as pieces of model parameter information in the model storage 18 (S29).

More specifically, "Ck," "s(xk)," "α[k, s(xk)]," and "w[k, s(xk)]" are stored while the pieces of information are linked to the "C" (constant term), "segment" (segment), "B" (unknown characteristic term), and "w" (confidence value) attributes, respectively, of the piece of model information in the model storage 18.

Figure 16:
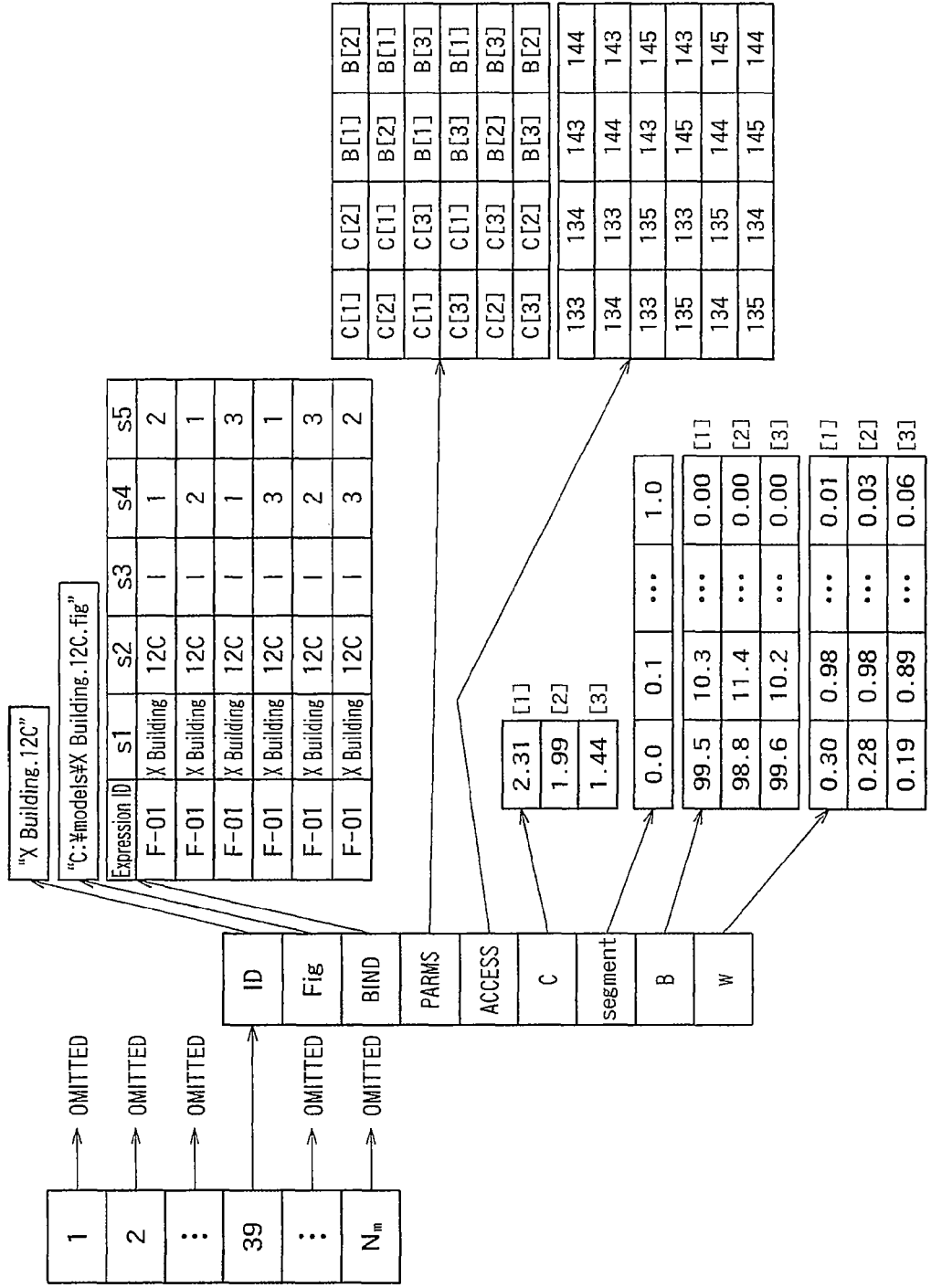
FIG. 16 is a diagram showing an example of a piece of model information.

FIG. 16 shows an example of a piece of model information after pieces of parameter information are added in step S29.

[Anomaly Detection]

The time-series data storage (second time-series data storage) 19 stores, in real-time, quantities of state (e.g., instruction value and flow rate) of a device, for which anomaly detection is to be performed, as a piece of time-series data (second time-series data) at fixed time intervals. More specifically, the time-series data storage 19 successively stores a quantity of state corresponding to each handle ID as shown in FIG. 5. FIG. 17 shows an example of time-series data stored in the time-series data storage 19. A period, during which the time-series data storage 19 stores data is a second period different from the first period, during which the reference time-series data storage 17 stores data. The second period may be after or before the first period.

The sensor information storage 21 stores sensor/actuator accuracy information. As accuracy information, for example, an accuracy guaranteed at the time of factory shipping by a manufacturer is used. In this example, a maximum detection error for each flow sensor is stored as, e.g., ±5% or ±0.5 (m/s) in the sensor information storage 21. A maximum response error of an actuator for a damper position is also stored in the sensor information storage 21. The maximum response error of an actuator indicates to what extent, at most, an error occurs in actual operational position of a valve for an instruction value. Note that the accuracy information of an actuator may be converted into an expression as a damper position and be stored in the sensor information storage 21. For example, a damper position range corresponding to the position error range of a valve may be obtained, and the obtained range may be stored as accuracy information.

The anomaly detector 13 includes a model loader 131, a data selector 132, an abnormality score calculator (determination score calculator) 133, a comprehensive abnormality determiner 134, and an anomaly detection presenting information generator 135.

The anomaly detector 13 loads time-series data for an arbitrary period, for which diagnosis is to be performed, from the time-series data storage 19 and determines from the loaded time-series data whether there is an abnormality in a control device (actuator) or a sensor. The anomaly detector 13 stores a determination result in the result storage 20 and displays the determination result on the display 16.

The model generator 11 and model optimizer 12 described earlier are blocks which are executed immediately after introduction of the anomaly detecting apparatus 1 or when there is a change in an environment surrounding a device, for which anomaly detection is to be performed, whereas the anomaly detector 13 is executed at all times or at regular intervals (e.g., once every day). This presupposes that pieces of model information generated and updated by the model generator 11 and model optimizer 12 are stored in the model storage 18 before execution of processing by the anomaly detector 13.

A description will be given below in the context of a case where diagnosis of an abnormality in VAV position and VAV flow rate is executed once a day.

Figure 18:
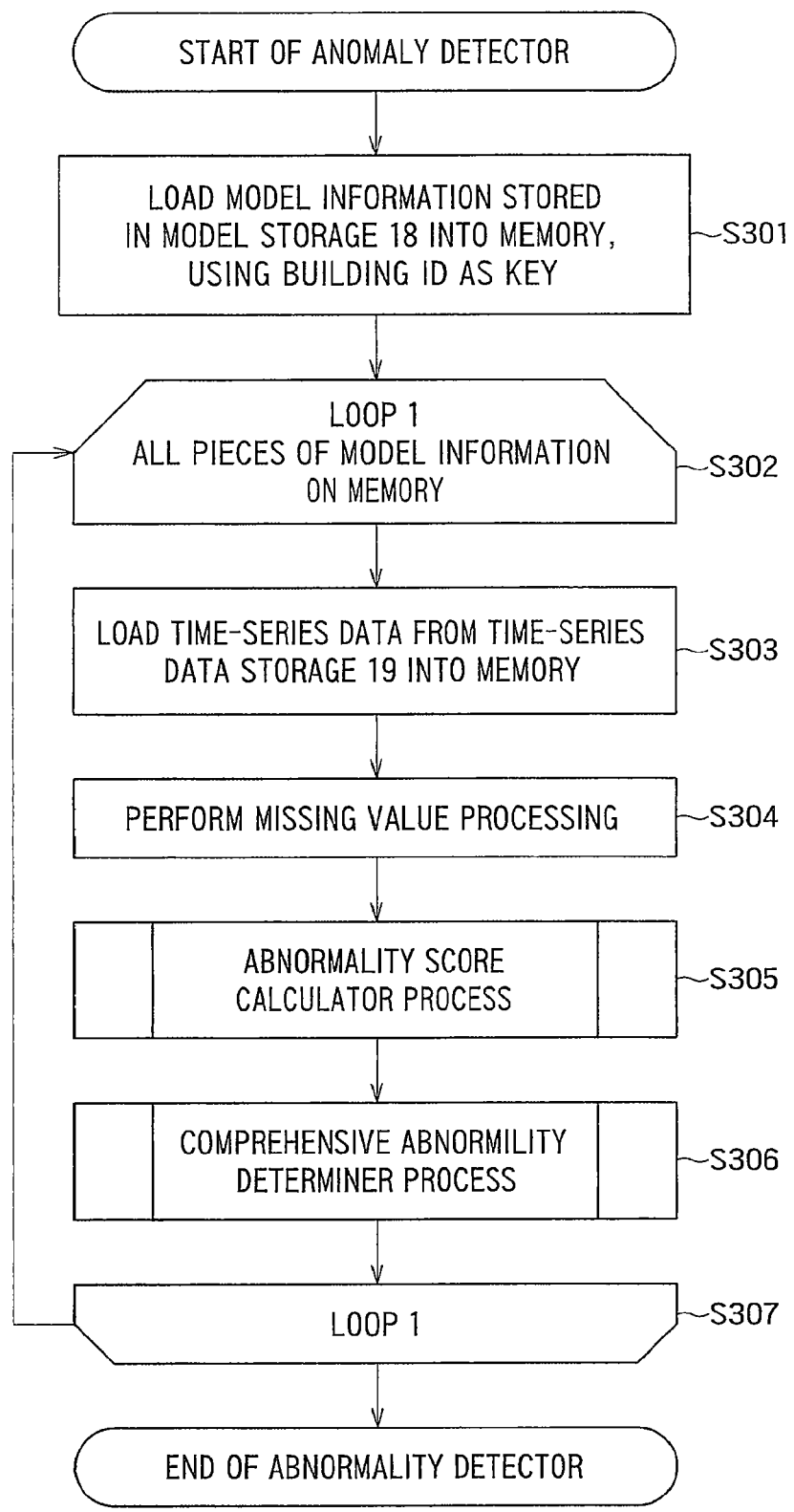
FIG. 18 is a flow chart showing a flow of processing by an anomaly detector.

FIG. 18 is a flow chart showing a flow of processing by the components 131 to 134 in the anomaly detector 13.

The model loader 131 first loads pieces of model information stored in the model storage 18 (S301). More specifically, the model loader 131 loads a piece of model information (for each room on each floor) stored in the model storage 18 using a building ID as a key. Abnormality diagnosis is performed by performing the subsequent steps for each piece of model information. For illustrative simplicity, a description will be given with the piece of model information for the room C on the 12th floor in mind.

The data selector 132 loads corresponding pieces of time-series data (values corresponding to the "ACCESS" attribute and times) from the time-series data storage 19 using the "ACCESS" attribute, for each diagnostic model instance of the piece of model information (S303).

The data selector 132 performs missing value processing on the loaded pieces of time-series data (S304). The missing value processing may be performed by an existing method. It is desirable to use a modified median filter which does not make a major change to the loaded pieces of time-series data, has a relatively high capability of removing a missing value and an outlier, and has low computational complexity. This step can be omitted.

The abnormality score calculator 133 calculates an abnormality score (determination score) (S305). The processing is repeatedly executed for each diagnostic model instance in the piece of model information.

Figure 19:
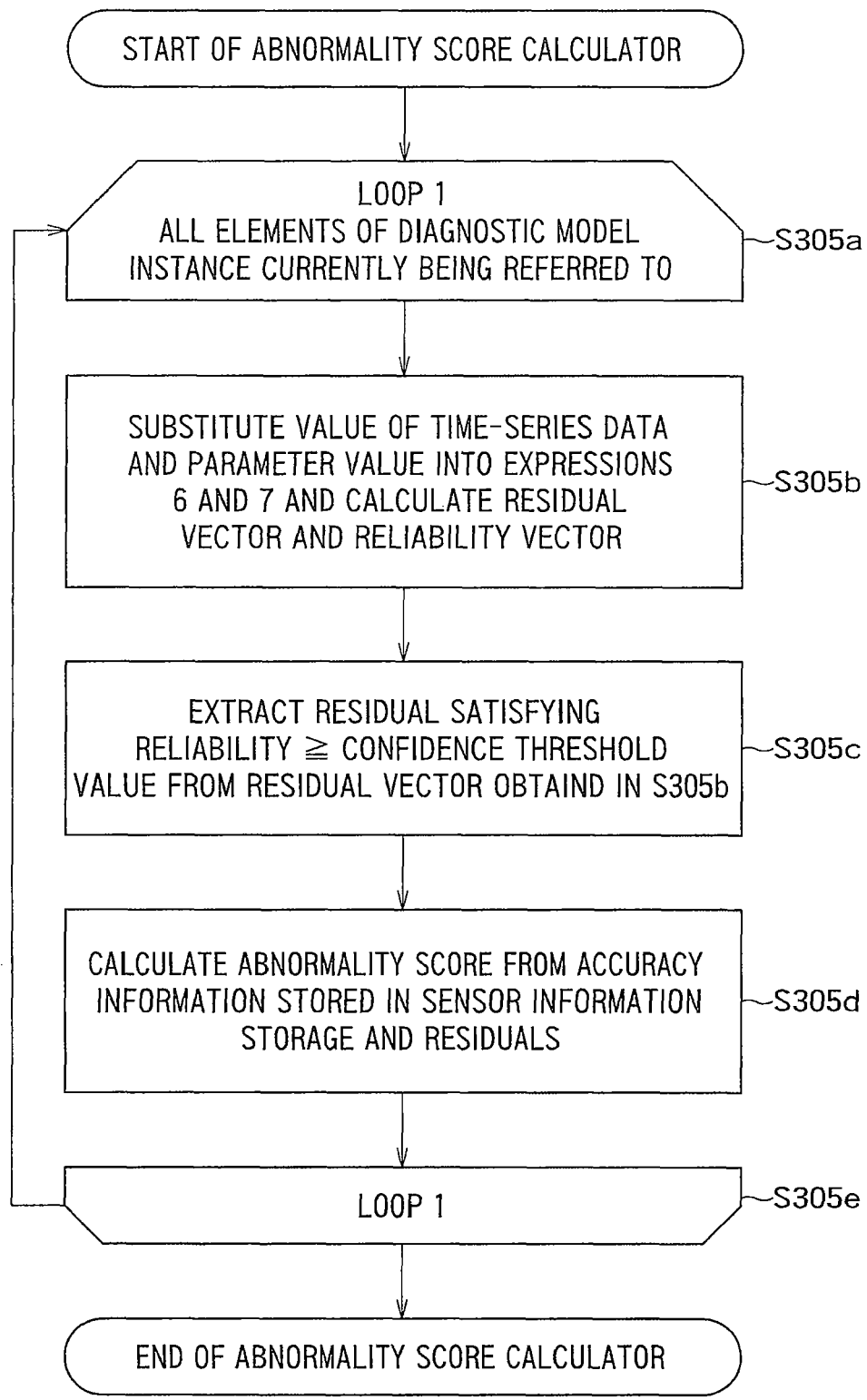
FIG. 19 is a flow chart showing a flow of an abnormality score calculating process by an abnormality score calculator.

FIG. 19 is a flow chart showing a flow of an abnormality score calculating process by the abnormality score calculator 133.

The abnormality score calculator 133 first refers to corresponding parameter information and data for each time of time-series data on the basis of the "PARMS" attribute and "ACCESS" attribute corresponding to the first diagnostic model instance and calculates Expression 6 (a formula to calculate a residual) and Expression 7 (a formula to calculate reliability), thereby obtaining a residual vector and a reliability vector (S305a and S305b). The details will be described below with reference to FIGS. 20 and 21.

$$e = (C[i] + \alpha[i, s(xi)]) \times (Qi/Qj)^2 - (C[j] + \alpha[j, s(xj)])$$ (Expression 6)

$$r = w[i, s(xi)] \times w[j, s(xj)]$$ (Expression 7)

Figure 20:
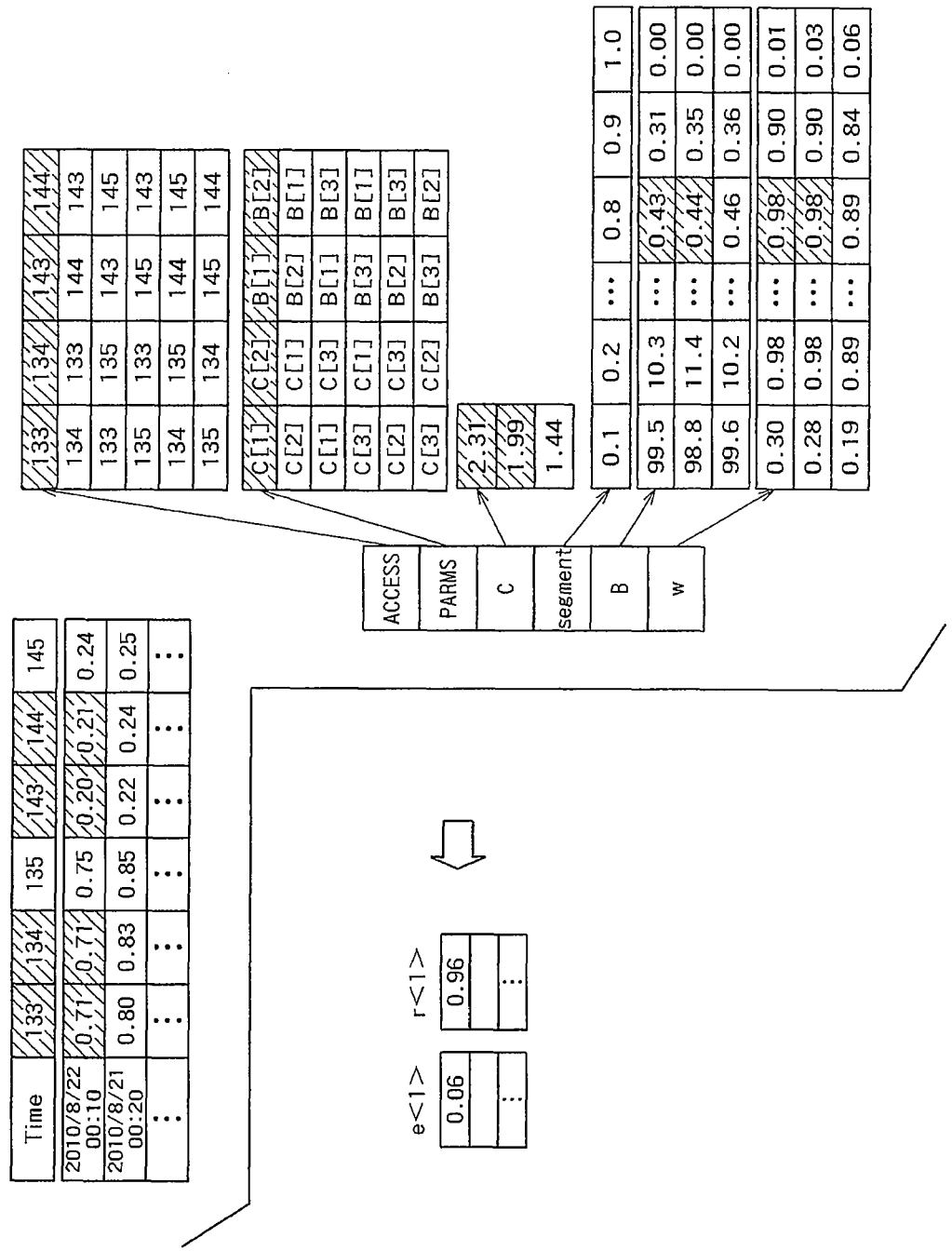
FIG. 20 is a diagram for explaining an example of calculating a residual and reliability.

For example, in the case of the first diagnostic model instance <1>, the abnormality score calculator 133 refers to pieces of time-series data in the first row, as shown in FIG. 20. Of the pieces of time-series data for "2010/8/22/00:10" (pieces of time-series data for the earliest time during a diagnosis period), values for the IDs of 133, 134, 143, and 144 in the "ACCESS" attribute are referred to. The ID of 133 corresponds to the damper position of VAV1, the ID of 134 corresponds to the damper position of VAV2, the ID of 143 corresponds to the flow rate of VAV1, and the ID of 144 corresponds to the flow rate of VAV2 (see FIG. 5).

The constant terms "C1" and "C2" of VAV1 and VAV2 are 2.31 and 1.99, respectively.

Values of an unknown characteristic term "B1($\alpha$[1, s(x1)])" of VAV1 and an unknown characteristic term "B2($\alpha$[2, s(x2)])" of VAV2 are 0.43 and 0.44, respectively. That is, a value of an observed variable (the damper position) of VAV1 is 0.71 (a value of a piece of time-series data for the ID of 133). Since 0.71 belong to the segment "0.8" in the "segment" attribute, $\alpha[1, s(0.71)] = \alpha[1, 0.8] = 0.43$. Similarly, a value of an observed variable (the damper position) of VAV2 is 0.71 (a value of a piece of time-series data for the ID of 134). Since 0.71 belong to the segment "0.8" in the "segment" attribute, $\alpha[2, s(0.71)] = \alpha[2, 0.8] = 0.44$.

Confidence values of the unknown characteristic terms "B1" and "B2" are 0.98 corresponding to the segment "0.8" in the "segment" attribute.

Flow rate "Q1" and "Q2" of the flow sensors AF1 and AF2 are 0.20 and 0.21 (values of pieces of time-series data for the IDs of 143 and 144), respectively.

Accordingly, a residual for the diagnostic model instance <1> is calculated by Expression 6 in the manner below.

$$e = (C[i] + \alpha[i, s(xi)]) \times (Qi/Qj)^2 - (C[j] + \alpha[j, s(xj)])$$

$$= (C[1] + \alpha[1, s(x1)]) \times (Q1/Q2)^2 - (C[2] + \alpha[2, s(x2)])$$

$$= (2.31 + \alpha[1, s(0.71)]) \times (0.20/0.21)^2 - (1.99 + \alpha[2, s(0.71)])$$

$$= (2.31 + \alpha[1, 0.8]) \times (0.20/0.21)^2 - (1.99 + \alpha[2, 0.8])$$

$$= (2.31 + 0.43) \times (0.20/0.21)^2 - (1.99 + 0.44)$$

$$= 0.06$$

The reliability of the diagnostic model instance <1> is calculated by Expression 7 in the manner below.

$$r = w[i, s(xi)] \times w[j, s(xj)]$$

$$= w[1, s(x1)] \times w[2, s(x2)]$$

$$= w[1, s(0.71)] \times w[2, s(0.71)]$$

$$= w[1, 0.8] \times w[2, 0.8]$$

$$= 0.98 \times 0.98$$

$$= 0.96$$

Figure 21:
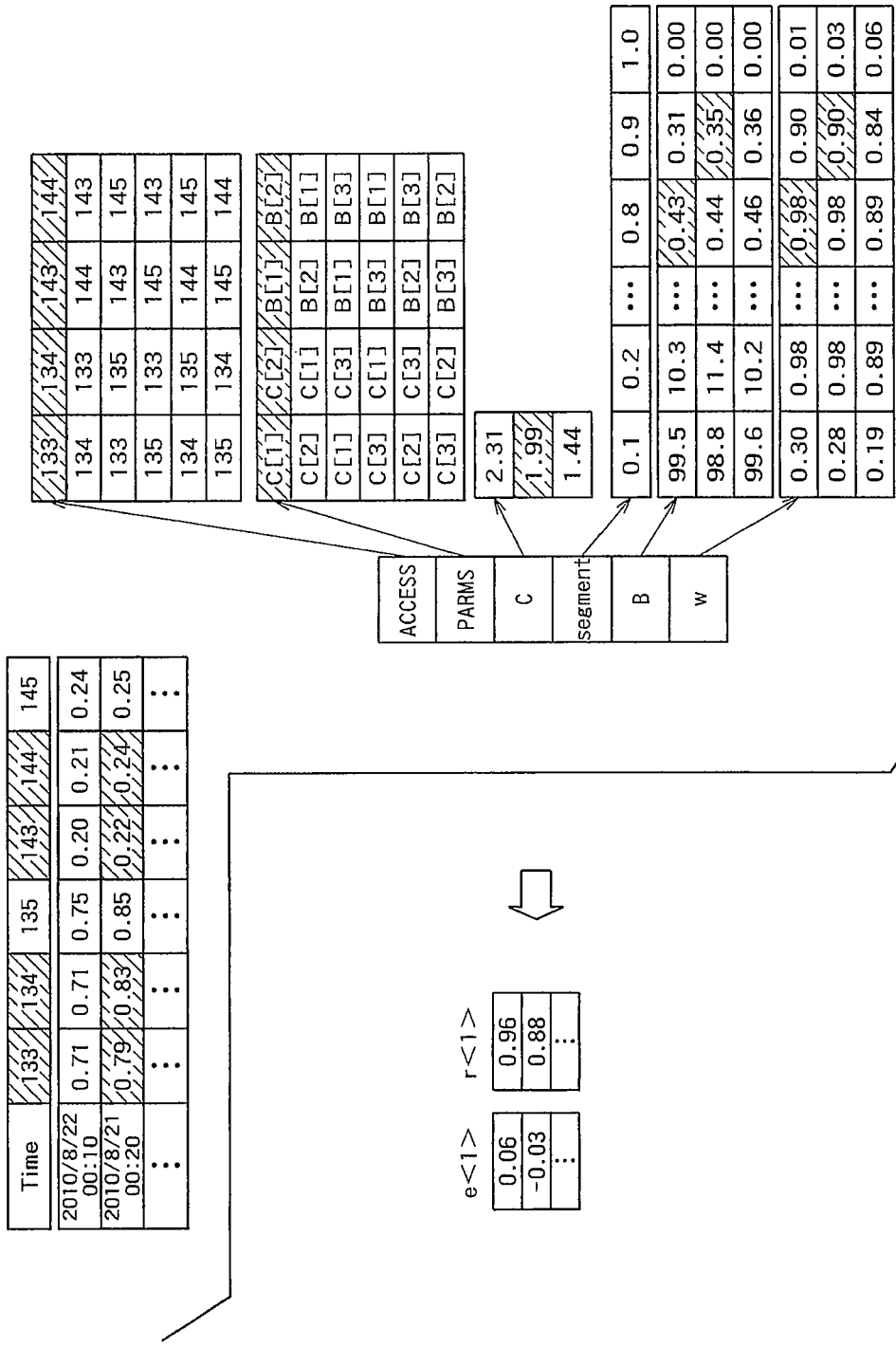
FIG. 21 is a diagram for explaining an example of calculating a residual and reliability.

Calculations of Expression 6 and Expression 7 described above is similarly performed for pieces of data for second and subsequent times of the time-series data. Reference to pieces of data for the second time is as shown in FIG. 21. In this case, e is calculated to be –0.03 by Expression 6, and r is calculated to be 0.88 by Expression 7.

With the above-described processing, a residual vector e<1> composed of arranged residuals "e," the number of which is equal to the number of pieces of data (the number of times) included in the time-series data, and a reliability vector r<1> composed of an equal number of arranged reliabilities "r" are obtained for the diagnostic model instance <1>, as shown below.

residual vector e<1>=(e1, e2, e3, . . . , en) n: the number of pieces of data reliability vector r<1>=(r1, r2, r3, . . . , rn)

Note that the numeric value in < > means corresponding to the first diagnostic model instance <1>.

In step S305c, the abnormality score calculator 133 checks the value of each element in the reliability vector and identifies all of elements with values not less than a predetermined confidence threshold value. The abnormality score calculator 133 extracts a residual corresponding to a position (time), to which each of the identified elements corresponds, from the residual vector. For example, "rx" ("x" is an arbitrary value of 1 to "n") is not less than the confidence threshold value, the abnormality score calculator 133 extracts a residual "ex" from the residual vector. An unextracted residual is considered as poorly reliable and is not used in subsequent processing. The confidence threshold value corresponds to a second threshold value.

The abnormality score calculator 133 loads corresponding pieces of accuracy information from the sensor information storage 21. The abnormality score calculator 133 obtains abnormality scores (determination scores), using the loaded pieces of accuracy information and the group of residuals extracted in step S305c (S305d). For example, in the case of the diagnostic model instance <1>, pieces of accuracy information to be loaded are pieces of accuracy information of the flow sensors AF1 and AF2 and pieces of accuracy information of VAV1 and VAV2.

Figure 22:
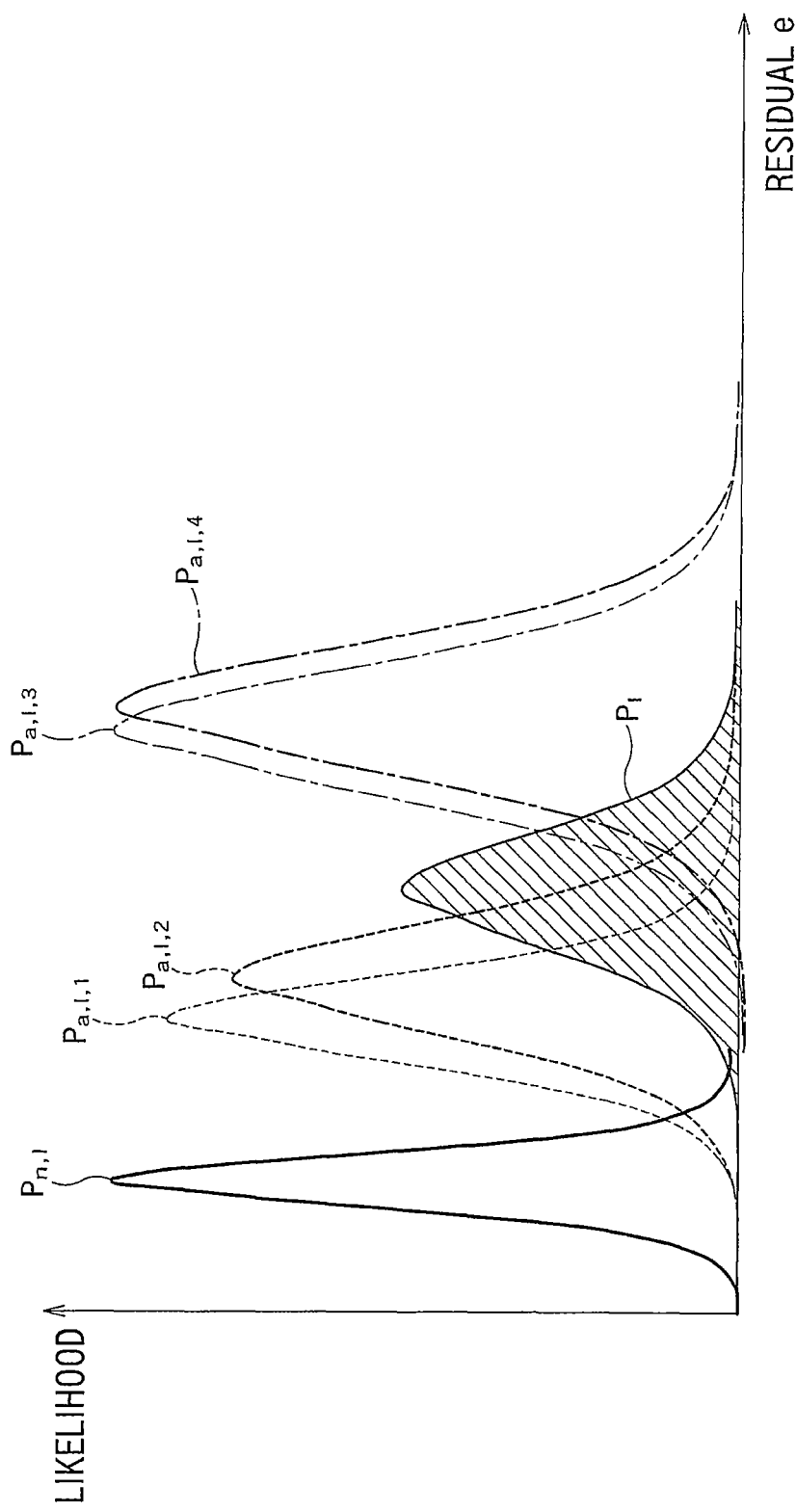
FIG. 22 is a graph for explaining a method for calculating an abnormality score.

FIG. 22 is a graph for explaining a method for calculating an abnormality score.

The abnormality score calculator 133 first obtains a probability distribution $P_l$ of the residuals extracted in step S305c. More specifically, the abnormality score calculator 133 calculates the mean and variance of the residuals "e," assumes normal distribution, and obtains the probability distribution $P_l$ on the basis of the mean and variance. That is, $P_l$ is the probability distribution of residuals obtained by using the time-series data loaded from the time-series data storage 19 as input and parameters of the l-th diagnostic index. The probability distribution $P_l$ corresponds to a second probability distribution.

The abnormality score calculator 133 also obtains a probability distribution $P_{n,l}$ when there is no abnormality. The abnormality score calculator 133 first extracts residuals using reference time-series data stored in the reference time-series data storage and the optimized l-th diagnostic model instance <l> in steps S305b and S305c. The abnormality score calculator 133 obtains the mean and variance of the extracted residuals, assumes normal distribution, and obtains the probability distribution $P_{n,l}$ on the basis of the mean and variance. That is, $P_{n,l}$ is the probability distribution of residuals obtained by using the reference time-series data loaded from the reference time-series data storage 17 as input and the parameters of the l-th diagnostic index. The probability distribution $P_{n,l}$ corresponds to a first probability distribution.

The abnormality score calculator 133 further obtains, for each sensor/VAV (actuator), a probability distribution $P_{a,l,k}$ column when a static abnormality is assumed to occur. "k" is a column number of the access table. In this example, since k=1 to 4, a probability distribution $P_{a,l,1}$, a probability distribution $P_{a,l,2}$, a probability distribution $P_{a,l,3}$, and a probability distribution $P_{a,l,4}$ are obtained. The abnormality score calculator 133 first corrects values corresponding to the l-th row and k-th column of the access table in the reference time-series data of the reference time-series data storage 17, according to a corresponding piece of accuracy information. The abnormality score calculator 133 extracts residuals using the corrected pieces of reference time-series data and the optimized l-th diagnostic model instance <l> in steps S305b and S305c. The abnormality score calculator 133 obtains the mean and variance of the extracted residuals, assumes normal distribution, and obtains the probability distribution $P_{a,l,k}$ on the basis of the mean and variance. The processing is performed for each of the cases of k=1 to k=4. The probability distribution $P_{a,l,k}$ corresponds to third probability distribution.

Expressions for obtaining residuals by correcting values of sensors/actuators corresponding to the cases of k=1 to k=4 are shown below as Expressions 8-1 to 8-4.

$e(k=1)=(C[i]+\alpha[i,xi+\Delta xi])\,(Qi/Qj)^2-(C[j]+\alpha[j,\,xj])$ (Expression 8-1)

$e(k=2)=(C[i]+\alpha[i,xi])(Qi/Qj)^2-(C[j]+\alpha[j,xj+\Delta xj])$ (Expression 8-2)

$e(k=3)=(C[i]+\alpha[i,xi])((Qi+\Delta Qi)/Qj)^2-(C[j]+\alpha[j,xj])$ (Expression 8-3)

$e(k=4)=(C[i]+\alpha[i,xi])(Qi/(Qj+\Delta Qj))^2-(C[j]+\alpha[j,xj])$ (Expression 8-4)

Figure 23:
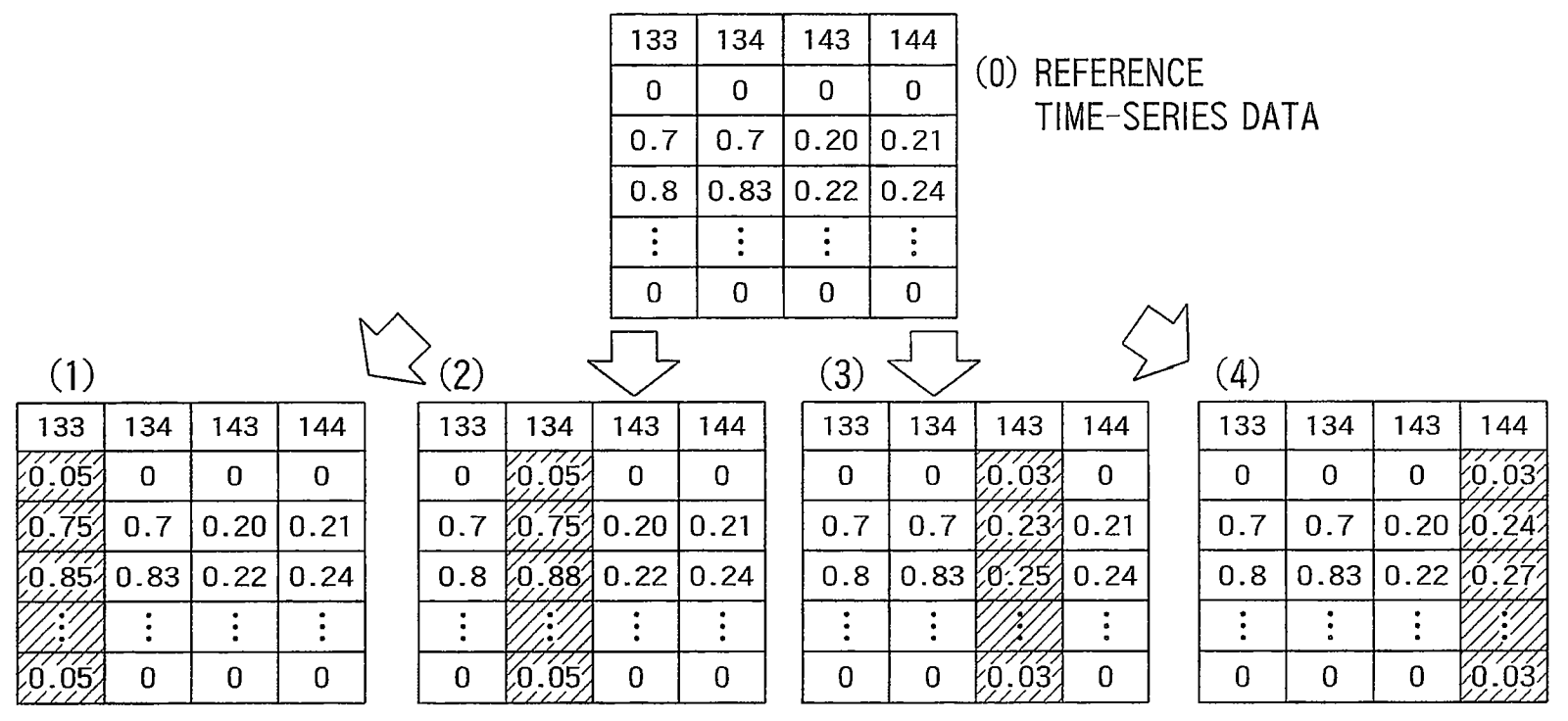

FIG. 23 shows how values corresponding to the k-th column of the access table in the reference time-series data are corrected. (1) shows a result of correcting values in the first column (k=1), (2) shows a result of correcting values in the second column (k=2), (3) shows a result of correcting values in the third column (k=3), and (4) shows a result of correcting values in the fourth column (k=4). For example, in (1), an instruction value "xi" in the k-th (k=1) column in Expression 8-1 is corrected to $xi+\Delta xi$. A correction method here is to add a maximum error in a direction that increases (or decreases) accuracy information. In (1), a maximum error of +0.05 is added. Correction of an instruction value is performed by obtaining a difference for an instruction value corresponding to a maximum error in position and correcting the instruction value with the obtained difference. Correction is performed in the same manner in (2) to (4). A case where the direction that increases accuracy information and the direction that decreases accuracy information are both taken into consideration will be described later.

After obtaining the probability distribution $P_{a,l,1}$, probability distribution $P_{a,l,2}$, probability distribution $P_{a,l,3}$, and probability distribution $P_{a,l,4}$ in the above-described manner, the abnormality score calculator 133 calculates abnormality scores using extended KL divergence (Kulback-Leibler divergence).

KL divergence is used as a measure of a difference between probability distributions. Although KL divergence does not have symmetry and thus is not a distance, extended KL divergence used here has symmetry and thus can be defined as a distance between probability distributions.

Extended KL divergence associated with discrete random variable probability distributions P and Q is defined by Expression 9 below. The extended KL divergence is known to be 0 when the probability distributions P and Q coincide with each other, to increase with an increase in difference, and not to have a negative value.

$$D_{kL}(P, Q) = \sum_i \left\{ P(i)\log\frac{P(i)}{Q(i)} + Q(i)\log\frac{Q(i)}{P(i)} \right\}$$ (Expression 9)

The abnormality score calculator 133 obtains an abnormality score Score(l,k) for the k-th sensor/actuator in the l-th optimized diagnostic model instance on the basis of the KL divergence in the manner below.

The abnormality score calculator 133 first obtains a difference (extended KL divergence) between the probability distribution $P_l$ and the probability distribution $P_{n,l}$ in the l-th optimized diagnostic model instance by Expression 10 below.

$$D_{kL}(P_l, P_{n,l}) = \sum_i \left\{ P_l(i)\log\frac{P_l(i)}{P_{n,l}(i)} + P_{n,l}(i)\log\frac{P_{n,l}(i)}{P_l(i)} \right\}$$ (Expression 10)

The abnormality score calculator 133 obtains a difference (extended KL divergence) between the probability distribution $P_l$ and the probability distribution $P_{a,l,k}$ in the l-th optimized diagnostic model instance by Expression 11 below.

$$D_{kL}(P_l, P_{a,l,k}) = \sum_i \left\{ P_l(i)\log\frac{P_l(i)}{P_{a,l,k}(i)} + P_{a,l,k}(i)\log\frac{P_{a,l,k}(i)}{P_l(i)} \right\}$$ (Expression 11)

On the basis of the foregoing, the abnormality score Score(l,k) for the k-th sensor can be defined in the manner below.

$$\text{Score}(l, k) = \frac{D_{KL}(P_l, P_{n,l})}{D_{KL}(P_l, P_{n,l}) + D_{KL}(P_l, P_{a,l,k})}$$ (Expression 12)

Figure 25:
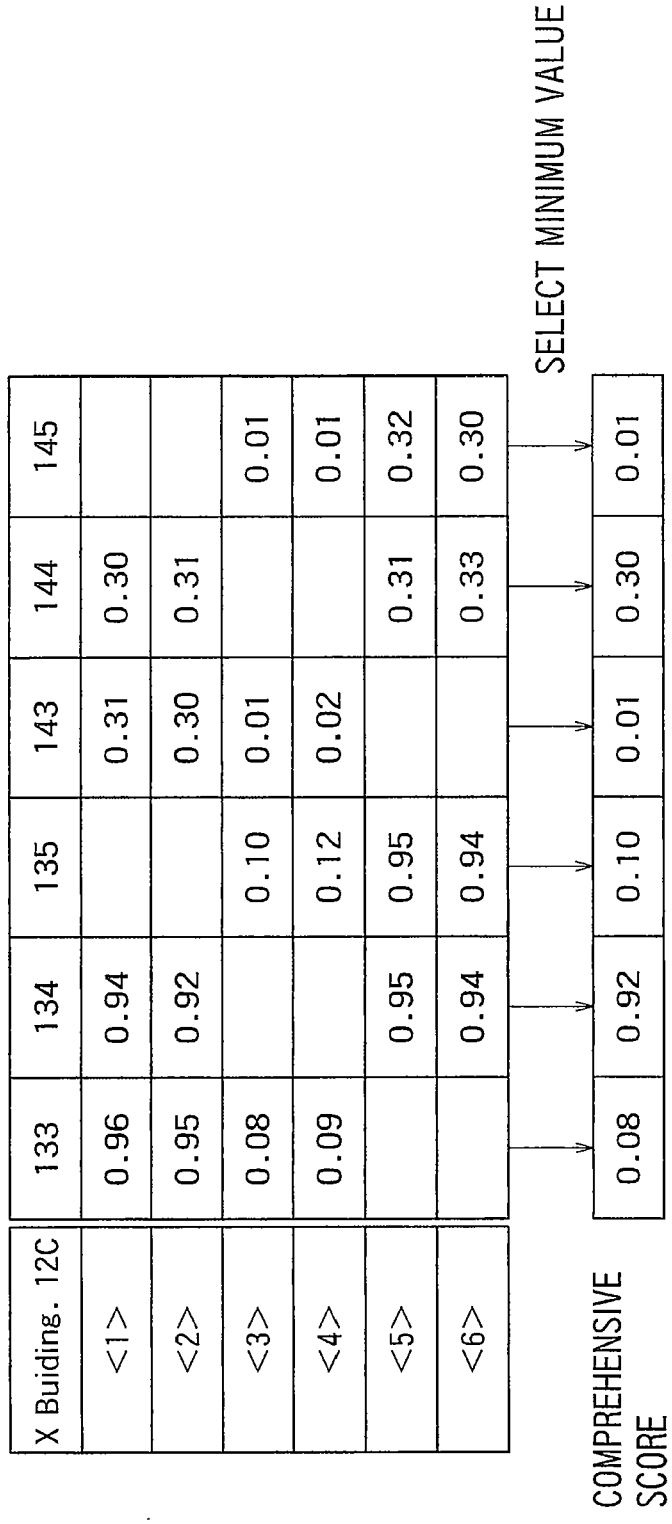
FIG. 25 is a chart showing a calculated abnormality score and an example of calculating a comprehensive score.

Respective abnormality scores calculated for the sensors/actuators corresponding to the cases of k=1 to k=4 for each of the diagnostic indices <1> to <6> are shown on the upper side of FIG. 25.

In the above description, only one of the direction that increases accuracy information and the direction that decreases accuracy information is taken into consideration at the time of correction. In a case where the increasing direction and the decreasing direction are both taken into consideration, the processing below may be performed. The abnormality score calculator 133 first performs, for each of Expressions 8-1 to 8-4 corresponding to the cases of k=1 to k=4, correction in the increasing direction corresponding to a maximum error and obtains the square (e^2) of a calculation result ("e"). Similarly, the abnormality score calculator 133 performs correction in the decreasing direction corresponding to the maximum error and obtains the square (e^2) of a calculation result ("e"). The abnormality score calculator 133 calculates the mean and variance of e^2s obtained by the correction in the increasing direction and the correction in the decreasing direction, assumes chi-square distribution, and obtains the probability distribution $P_{a,l,k}$, for each of the cases of k=1 to k=4. As for the probability distribution $P_{n,l}$ corresponding to the reference time-series data, the abnormality score calculator 133 obtains the square (e^2) of a residual "e," calculates the mean and variance of a group of e^2, assumes chi-square distribution, and obtains the probability distribution. As for the probability distribution $P_l$ corresponding to the time-series data in the time-series data storage 19, the abnormality score calculator 133 obtains the square (e^2) of a residual "e," calculates the mean and variance of a group of e^2, assumes chi-square distribution, and obtains the probability distribution. After that, the abnormality score calculator 133 obtains extended KL divergence and calculates an abnormality score, in the same manner as described earlier.

The anomaly detector 13 advances to a comprehensive abnormality determining process (S306).

Figure 24:
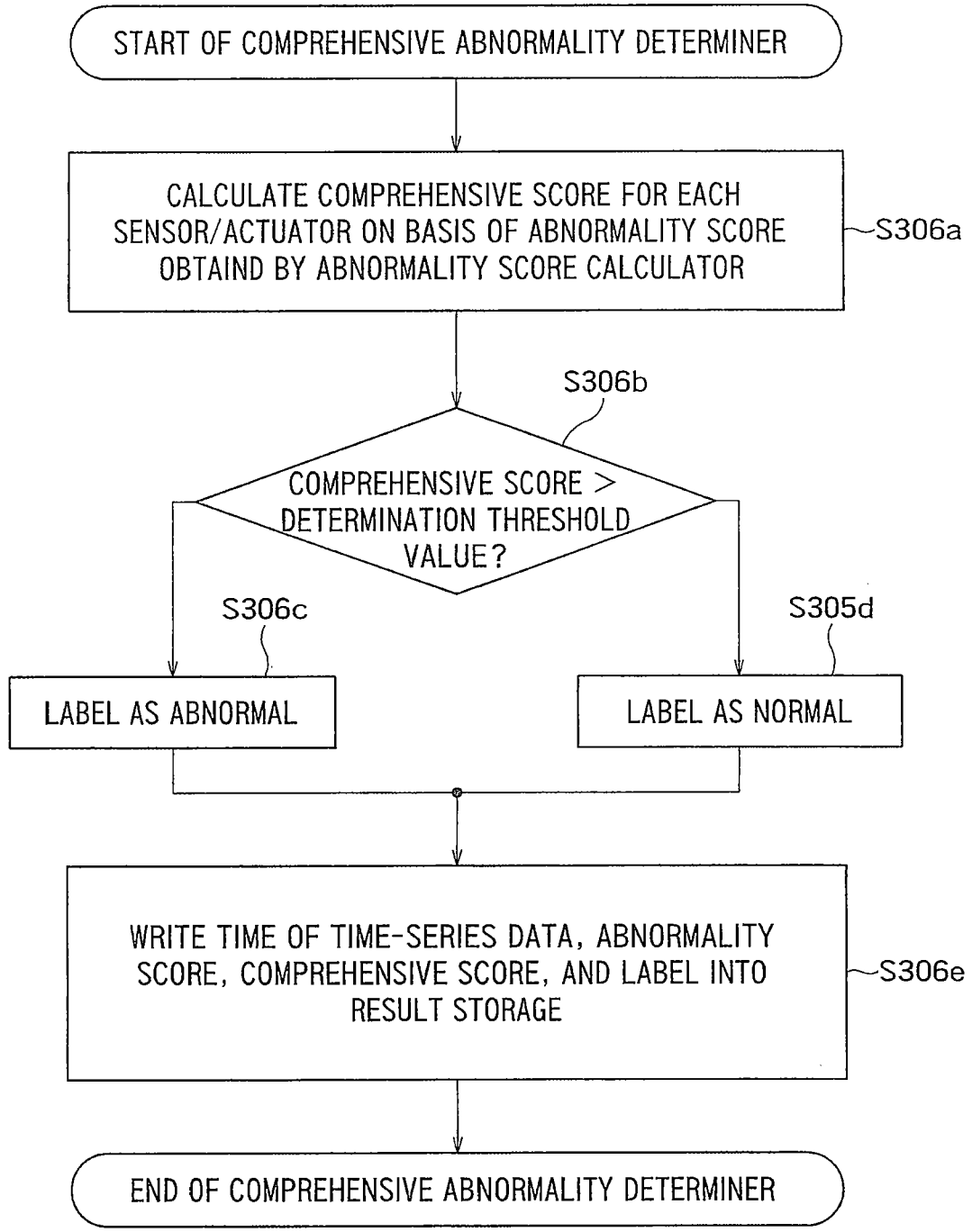
FIG. 24 is a flow chart showing a flow of a comprehensive abnormality determining process by a comprehensive abnormality determiner.

FIG. 24 is a flow chart showing a flow of the comprehensive abnormality determining process by the comprehensive abnormality determiner 134.

The comprehensive abnormality determiner 134 first calculates a comprehensive score for each of the sensors and actuators (VAV1 to VAV3 and the flow sensors AF1 to AF3) (S306a). The comprehensive abnormality determiner 134 calculates a comprehensive score using Expression 13 below. The comprehensive abnormality determiner 134 sets, as a comprehensive score, a minimum one of abnormality scores obtained for each l for each of the sensors and actuators.

$$\text{Score}(k) = \min\{\text{Score}(l,k)\}, l=1, \ldots, L \quad \text{(Expression 13)}$$

FIG. 25 shows an example of calculating a comprehensive score. The comprehensive score for the damper position (ID of 133) of VAV1 is a minimum value of 0.08 of abnormality scores of 0.96, 0.95, 0.08, and 0.09 calculated for the diagnostic indices <1> to <4>. Similarly, the comprehensive abnormality determiner 134 obtains a comprehensive score for each of the remaining sensors and actuators (IDs of 134, 135, 143, 144, and 145) by selecting a minimum value of abnormality scores.

In step S306b, the comprehensive abnormality determiner 134 compares the comprehensive score for each of the sensors and actuators with a predetermined determination threshold value. The comprehensive abnormality determiner 134 labels the corresponding sensor or actuator abnormal (S306c) if the comprehensive score is larger than the determination threshold value and labels the sensor or actuator normal (S306d) if the comprehensive score is not more than the determination threshold value. In this example, VAV2 with a comprehensive score of 0.92 is labeled abnormal, and VAV1 and VAV3 and the flow sensors AF1 to AF3 are labeled normal. The determination threshold value corresponds to a first threshold value.

In step S306e, the comprehensive abnormality determiner 134 writes, as a diagnostic result of the anomaly detector 13, a period for which diagnosis has been performed (a period corresponding to used pieces of time-series data), calculated abnormality scores, a comprehensive score, and what a corresponding sensor or actuator is labeled into the result storage 20 (S306e).

In the above description, the comprehensive abnormality determiner 134 obtains comprehensive scores by obtaining abnormality scores of sensors and actuators for each of the diagnostic model instances <1> to <6> and selecting a minimum abnormality score for each of the sensors and actuators. The comprehensive abnormality determiner 134 labels a sensor or actuator with a comprehensive score larger than the determination threshold value abnormal. In another embodiment, the comprehensive abnormality determiner 134 first calculates normality scores (determination scores) of sensors and actuators for each of the diagnostic model instances <1> to <6> by Expression 12a below. The comprehensive abnormality determiner 134 may select a maximum normality score for each of the sensors and actuators, label a sensor or actuator (point object name) with a comprehensive score not more than the determination threshold value abnormal, and label a sensor or actuator with a comprehensive score more than the determination threshold value normal.

$$\text{Score}(l, k) = \frac{D_{KL}(P_l, P_{a,l,k})}{D_{KL}(P_l, P_{n,l}) + D_{KL}(P_l, P_{a,l,k})} \quad \text{(Expression 12a)}$$

The anomaly detection presenting information generator 135 of the anomaly detector 13 dynamically generates a result display screen in a predetermined format, using pieces of information stored in the time-series data storage 19, reference time-series data storage 17, result storage 20, and sensor information storage 21 and displays the generated screen on the display 16.

Figure 27:
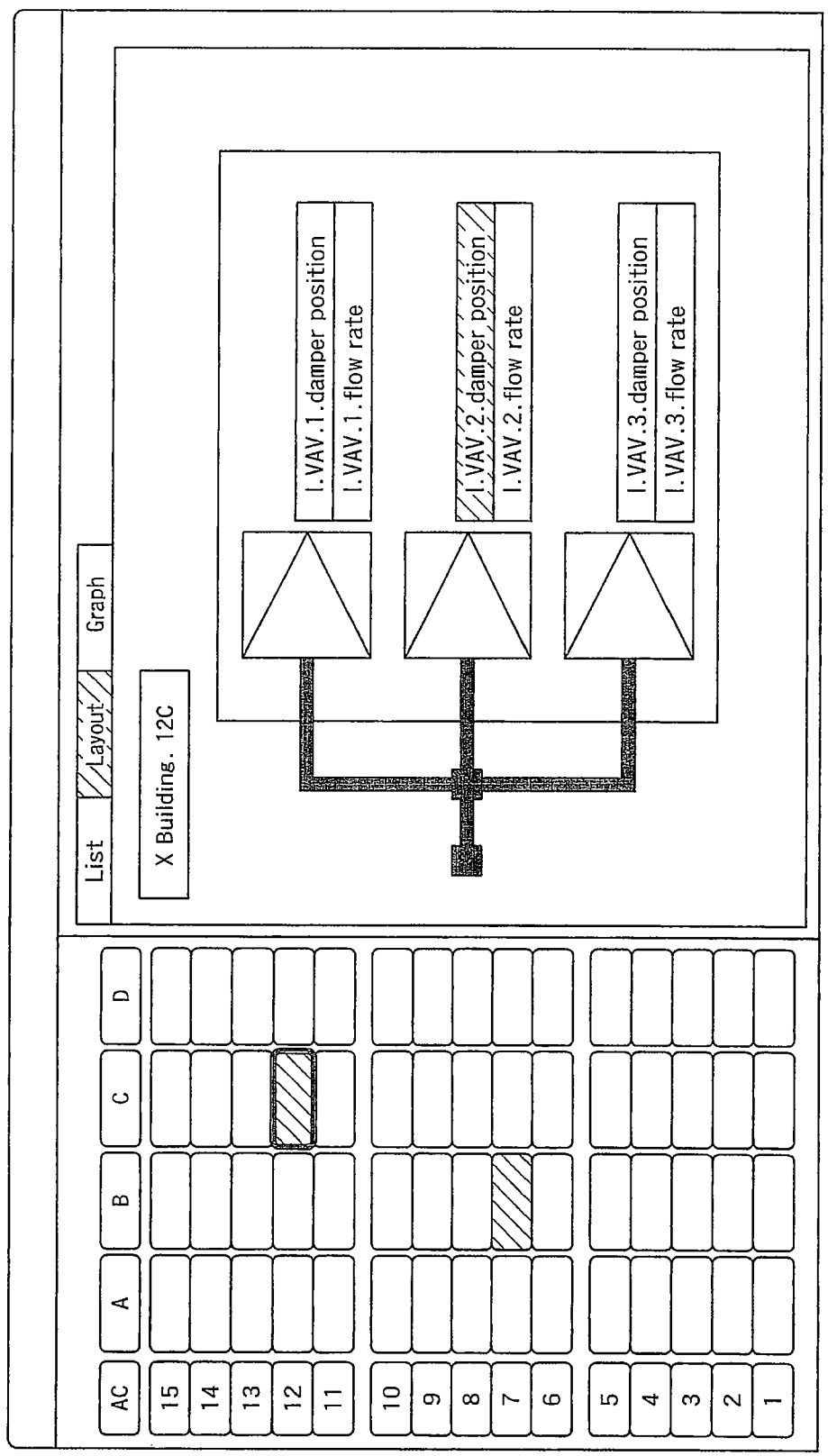
FIG. 27 is a view showing the example of the screen for result display.
Figure 28:
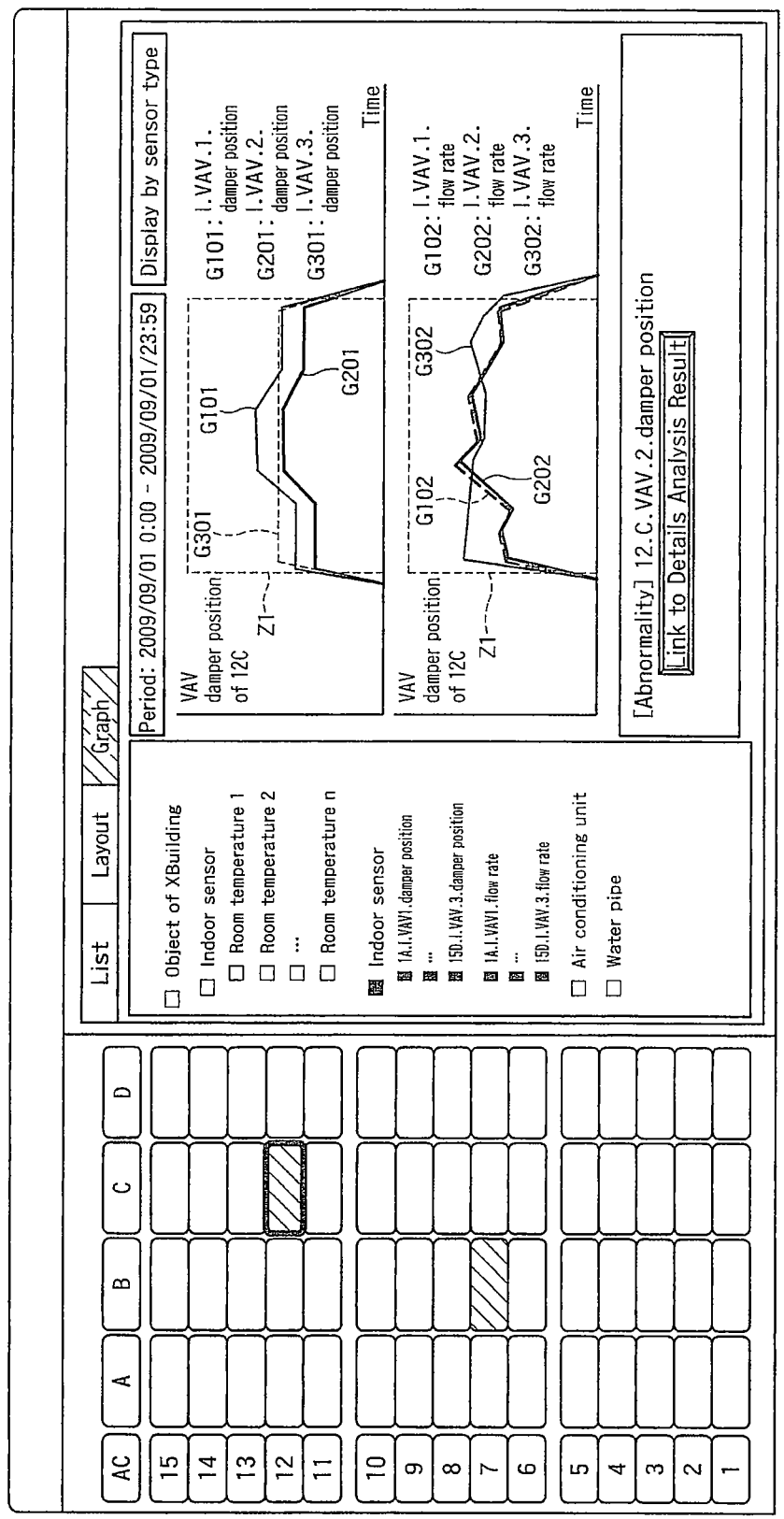
FIG. 28 is a view showing the example of the screen for result display.

FIGS. 26, 27, and 28 are examples of a result display screen generated by the anomaly detection presenting information generator 135.

FIG. 26 shows a display example when "List" in a screen is selected. Respective point object names and comprehensive scores of VAVs are displayed in descending order of comprehensive score. Note that a building name in each point object name is omitted in the shown example. On the left side of FIG. 26, a room provided with a sensor or VAV (actuator) labeled abnormal is shaded.

FIG. 27 shows a display example when "Layout" in the screen is selected.

The screen shown in FIG. 27 shows a display example when the room C on the 12th floor is selected from among the shaded rooms in FIG. 26. On the right side of FIG. 27, the VAV2-related point object name "X Building.12.C.I.VAV.2.damper position" labeled abnormal is shaded.

FIG. 28 shows a display example when "Graph" in the screen is selected.

FIG. 28 shows a display example when the room C on the 12th floor is selected. On the upper right side of FIG. 28, a coordinate system of damper position versus time is shown. In the coordinate system, a graph G101 of the damper position of VAV1, a graph G201 of the damper position of VAV2, and a graph G301 of the damper position of VAV3 are displayed.

On the lower right side of FIG. 28, a coordinate system of flow rate versus time is shown. In the coordinate system, a graph G102 of the flow rate of VAV1 (a value of the flow sensor AF1), a graph G202 of the flow rate of VAV2 (a value of the flow sensor AF2), and a graph G302 of the flow rate of VAV3 (a value of the flow sensor AF3) are shown.

The graphs G101, G201, G301, G102, G202, and G303 are each obtained by reading pieces of time-series data for a corresponding period (one day in this example) from the time-series data storage 19, using information on dates and times for diagnosis (Sep. 1, 2009 0:00 to 23:59 in this example) and plotting the loaded pieces of data.

Figure 29:
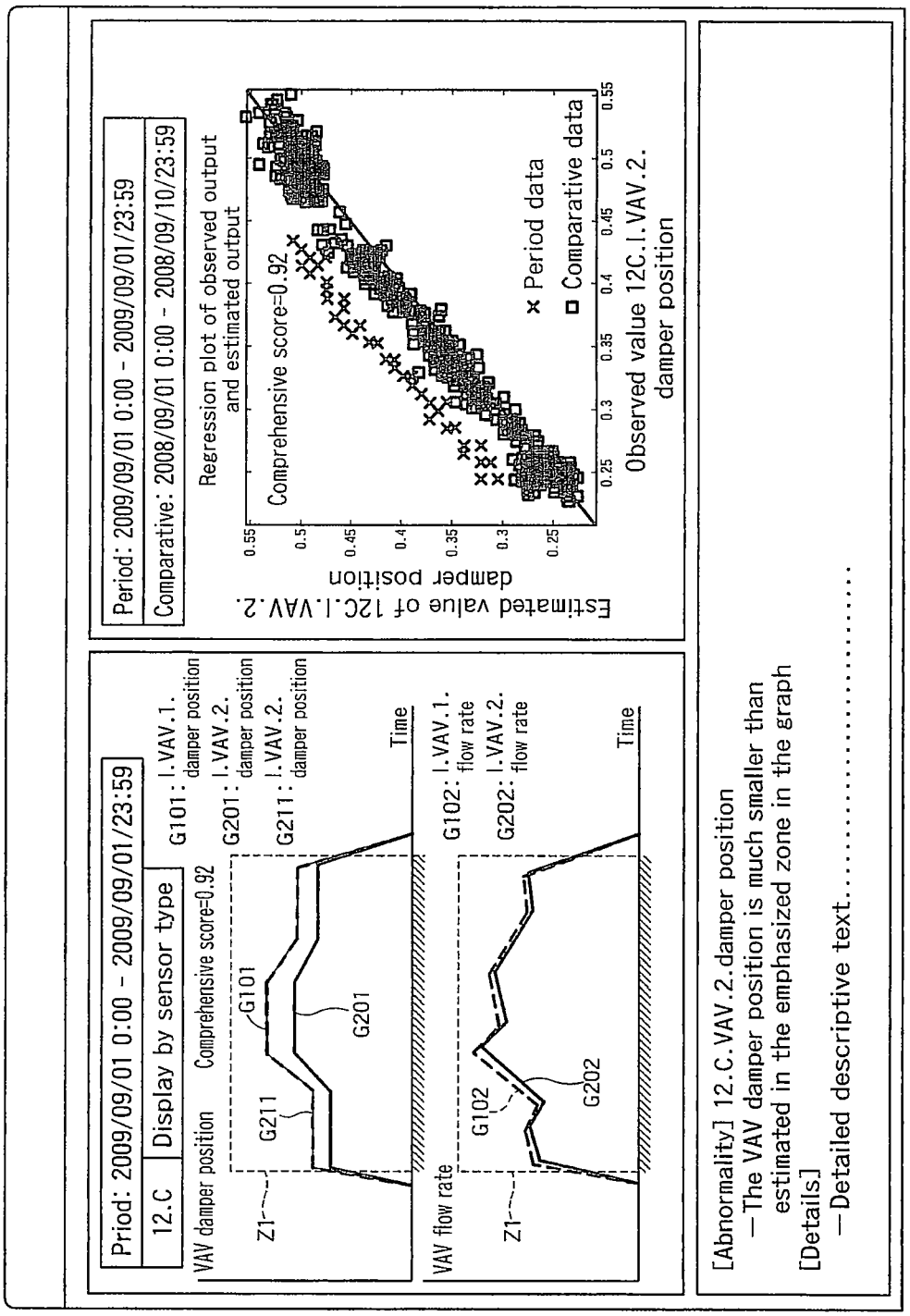
FIG. 29 is a view showing an example of an analysis result screen.

An abnormal zone Z1 is a zone when an abnormality is detected in the position of VAV2. When a user clicks on "Link to Details of Analysis Result" on the bottom right side for details using an input section, an analysis result screen in FIG. 29 is generated and displayed.

Like FIGS. 26 to 28, the anomaly detection presenting information generator 135 also dynamically generates the screen using pieces of information stored in the time-series data storage 19 and result storage 20.

This example is a case where "X Building. 12C.I.VAV.2.damper position" is labeled abnormal (a comprehensive score of 0.92). In this case, the anomaly detection presenting information generator 135 first loads the piece of model information for "X Building.12C" and refers to the diagnostic index <2> (see FIG. 25), for which a comprehensive score of 0.92 is output. The anomaly detection presenting information generator 135 loads pieces of time-series data (for a period for which diagnosis has been performed) corresponding to the index numbers of 133, 134, 143, and 144 in "ACCESS" of the diagnostic index <2> from the time-series data storage 19 and reference time-series data storage 17.

The graphs G101 and G201 on the upper left side of the screen and the graphs G102 and G202 on the lower left side of the screen are plots of pieces of data (observed values) loaded from the time-series data storage 19 and are same as those shown in FIG. 28.

The graph G211 on the upper left side of the screen shows an estimated damper position of VAV2. The estimated damper position is obtained using Expression 6. More specifically, assume that "e" in Expression 6 is 0. Parameters are substituted using the PARAMS information of a corresponding diagnostic model instance. Pieces of time-series data loaded from the time-series data storage 19 are substituted into variables other than "x[i]" determined as abnormal, "x[j]," "Q[i]," and "Q[j]," and "x[i]" is obtained. "x[i]" is an estimated value (period data estimated value).

Regression plots are shown on the right side of the screen. The regression plots are created in the manner below. "x[i]" is obtained as a comparative data estimated value by substituting pieces of reference time-series data loaded from the reference time-series data storage 17 into the variables "x[j]," "Q[i]," and "Q[j]" in Expression 6, as described above. "□" is plotted at an intersection of a value for "I.VAV2.damper position" of the loaded pieces of reference time-series data and a corresponding comparative data estimated value. "x" is plotted at an intersection of "I.VAV2.damper position" of the pieces of reference time-series data loaded from the time-series data storage 19 and the period data estimated value obtained above.

As described above, when normal data (reference time-series data) is input, since an observed value and an estimated value coincide approximately with each other, the data is plotted so as to approach a line with an abscissa equal to an ordinate (y=x). On the other hand, when abnormal data is inputted, since an estimated value deviating from an observed value is output, a plot is created so as to deviate from y=x.

In the above embodiment, two diagnostic model instances are generated for a target model for each pair of two VAVs. For example, the diagnostic model instances <1> and <2> are generated for the VAV1-VAV2 pair. However, in a simple example as in FIG. 2, even if only one is generated for each pair, anomaly detection is possible. Accordingly, in this case, only either one of <1> and <2> may be generated for the VAV1-VAV2 pair, only either one of <3> and <4> may be generated for the VAV1-VAV3 pair, and only either one of <5> and <6> may be generated for the VAV2-VAV3 pair.

Although in the above embodiment, all pairs for two VAVs are created according to the target model F-01, and a diagnostic model instance is generated for each pair, the present embodiment is not limited to this. For example, when a large number of VAVs are present, if weak mutual influence of a pair on each other is known in advance, a diagnostic model instance may not be generated for the pair. A pair for which a diagnostic model instance is to be generated may be specified in advance. The target model F-01 implies generation of all pairs.

As described above, according to the present embodiment, detection of an abnormality in a device (sensor or actuator) having an individual difference and an unknown characteristic can be performed with high accuracy.

(Modification)

The embodiments have been described earlier in the context of a damper position and a VAV flow rate of a VAV installed at a duct. However, the present invention is not limited to this and can be applied to the example below.

For example, an example using a damper position ("vw") for a cold water valve in a water regulating device and a water volume ("Qw") of the cold water valve is also possible. In this case, the model instance as shown below can be generated from Expression (1).

$$\min\_\{Ci, Cj, \beta i, \beta j\}$$

$$R=\{(Ci+\beta i(vwi))\times(Qwi/Qwj)^2-(Cj+\beta j(vwj))\}^2$$

The foregoing is an example, and the present invention can also be applied to various other examples.

The invention claimed is:

1. An anomaly detecting apparatus for first to K-th control devices and first to K-th sensors, the control devices being arranged at different locations on a medium path that control output of medium flowing in the medium path according to respective externally given instruction values and the sensors measuring output volumes of the medium controlled by the control devices, comprising:

a target model storage storing a target model defined by $(Ci+\beta i(Xi))\times(Qi/Qj)^2-(Cj+\beta j(Xj))$, where "Xi" is a first observed variable, "$\beta i(Xi)$" is a first unknown characteristic term that is an unknown function having input variable as "Xi," "Ci" is a first constant term, "Qi" is a second observed variable, "Xj" is a third observed variable, "$\beta j(Xj)$" is a second unknown characteristic term that is an unknown function having input variable as "Xj," "Cj" is a second constant term, and "Qj" is a fourth observed variable;

a first storage storing first time-series data each including the instruction values given to the first to K-th control devices and measured values from the first to K-th sensors at predetermined time intervals during a first period;

a model optimizer configured to generate, for each of combinations of two of the first to K-th control devices, a diagnostic model instance by assigning the instruction value for one of the two control devices to the "Xi" of the target model, an unknown constant corresponding to the location of the one control device to the "Ci," the measured value from the sensor corresponding to the one control device to the "Qi," the instruction value for the other control device to the "Xj," an unknown constant corresponding to the location of the other control device to the "Cj" and the measured value from the sensor corresponding to the other control device to the "Qj" and obtain each optimized diagnostic model instance in which the "βi(Xi)," the "Ci," the "βj(Xj)," and the "Cj" are identified using the first time-series data so as to minimize the squares of values of all of each diagnostic model instance, where the "βi(Xi)" is a function that takes values for sections partitioned in a domain of the "Xi" and the "βj(Xj)" is a function that takes values for sections partitioned in a domain of the "Xj";

a second storage storing second time-series data each including the instruction values given to the first to K-th control devices and measured values from the first to K-th sensors at predetermined time intervals during a second period different from the first period;

a third storage storing accuracy information, representing maximum observation errors of the first to K-th sensors and maximum response errors of the first to K-th control devices for the instruction values;

a determination score calculator configured to, for each optimized diagnostic model instance, obtain first residuals being values calculated from the optimized diagnostic model instance based on each piece of the first time-series data and generate a first probability distribution which is a probability distribution of the first residuals, obtain second residuals values calculated from the optimized diagnostic model instance based on each piece of the second time-series data and generate a second probability distribution which is a probability distribution of the second residuals, change, for each of the two control devices and two sensors based on which the optimized diagnostic model instance is generated, each corresponding value in each piece of the first time-series data according to the accuracy information, obtain third residuals being values calculated from the optimized diagnostic model instance based on each corresponding changed piece of time-series data, and generate each corresponding third probability distribution which is a probability distribution of the third residuals, and generate a first extended KL (Kulback-Leibler) divergence representing a distance between the second and first probability distributions and second extended KL divergences each representing a distance between the second probability distribution and each third probability distribution and calculate a determination score according to the ratio of the first extended KL divergence to the sum of the first extended KL divergence and each one of the second extended KL divergences, respectively; and a comprehensive abnormality determiner configured to obtain, for each of the first to K-th control devices and the first to K-th sensors, a comprehensive score which is a minimum value of determination scores obtained for each of the first to K-th control devices and the first to K-th sensors and, if the comprehensive score of any of the control devices and sensors is larger than a first threshold value, determine that an abnormality has occurred in the control device or the sensor.

2. The apparatus according to claim 1, wherein the model optimizer counts, for each of the first to K-th control devices, a number of pieces of data for each of the sections, the instruction value of which belongs to each of the sections, and sets a confidence value that increases with an increase in the number of pieces of data for each of the sections, and the determination score calculator calculates reliability by multiplying confidence values of two sections which cover values of the "Xi" and the "Xj" in each piece of first time-series data and generates the first probability distribution using only the first residuals that have been obtained from ones of the pieces of data for each of which the reliability not less than a second threshold value has been calculated, calculates reliability by multiplying confidence values of two sections which cover values of the "Xi" and the "Xj" in each piece of second time-series data and generates the second probability distribution using only the second residuals that have been obtained from ones of the pieces of data for each of which the reliability not less than the second threshold value has been calculated, and calculates reliability by multiplying confidence values of two sections which cover values of the "Xi" and the "Xj" in each piece of changed time-series data and generates the third probability distribution using only the third residuals that have been obtained from ones of the pieces of data for each of which the reliability not less than the second threshold value is calculated.

3. The apparatus according to claim 1, wherein the model optimizer further generates a diagnostic model instance by assigning the instruction value for the other control device to the "Xi," the unknown constant related to the other control device to the "Ci," the measured value from the sensor corresponding to the other control device to the "Qi," the instruction value for the one control device to the "Xj," the unknown constant related to the one control device to the "Cj," and the measured value from the sensor corresponding to the one control device to the "Qj."

4. The apparatus according to claim 1, wherein the determination score calculator calculates squares of the first residuals and generates a probability distribution of the squares of the first residuals as the first probability distribution, calculates squares of the second residuals and generates a probability distribution of the squares of the second residuals as the second probability distribution, and calculates squares of the third residuals and generates a probability distribution of the squares of the third residuals as the third probability distribution.

5. The apparatus according to claim 1, wherein the determination score calculator calculates the determination score according to the ratio of the second extended KL divergence to the sum of the first extended KL divergence and each one of the second extended KL divergences, respectively, and the comprehensive abnormality determiner obtains a maximum value of each determination score as the comprehensive score and, if the comprehensive score of any of the control devices and sensors is less than the first threshold value, determines that an abnormality has occurred in the control device or sensor.

6. The apparatus according to claim 1, wherein
the target model storage stores, as the target model, $(C_i+(\beta_i(X_i))) \times f(Q_i, Q_j) - (C_j+(\beta_j(X_j)))$ instead of the $(C_i+(\beta_i(X_i))) \times (Q_i/Q_j)\hat{}2(C_j+\beta_j(X_j))$, where $f(Q_i, Q_j)$ is a predetermined function whose input variables are "Qi" and "Qj".

7. The apparatus according to claim 1, wherein the first to K-th control devices are each a variable air volume terminal or a constant air volume terminal, the instruction values given to the first to K-th control devices are each a damper position for a valve of the variable air volume terminal or the constant air volume terminal, and the first to K-th sensors are flow sensors.

8. The apparatus according to claim 1, wherein the first to K-th control devices are water regulating devices, the instruction values given to the first to K-th control devices are each a damper position for a valve of the water regulating device, and the first to K-th sensors are water volume sensors.

* * * * *